United States Patent
Nimura et al.

(10) Patent No.: US 9,150,206 B2
(45) Date of Patent: Oct. 6, 2015

(54) BRAKE SYSTEM AND ACTUATOR CONTROL DEVICE

(75) Inventors: Kazunori Nimura, Toki (JP); Takayuki Yamamoto, Aichi-gun (JP); Tetsuya Miyazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/127,637

(22) PCT Filed: Jul. 11, 2011

(86) PCT No.: PCT/JP2011/065808
§ 371 (c)(1),
(2), (4) Date: Dec. 19, 2013

(87) PCT Pub. No.: WO2013/008298
PCT Pub. Date: Jan. 17, 2013

(65) Prior Publication Data
US 2014/0131150 A1 May 15, 2014

(51) Int. Cl.
*B60T 13/74* (2006.01)
*B60T 15/36* (2006.01)
(Continued)

(52) U.S. Cl.
CPC ............... *B60T 15/36* (2013.01); *B60K 6/445* (2013.01); *B60L 1/003* (2013.01); *B60L 7/26* (2013.01); *B60L 11/126* (2013.01); *B60L 11/14* (2013.01); *B60L 11/1868* (2013.01); *B60L 15/2009* (2013.01); *B60L 15/2036* (2013.01); *B60T 1/10* (2013.01); *B60T 8/172* (2013.01); *B60T 13/586* (2013.01); *B60T 13/686* (2013.01); *B60T 13/741* (2013.01); *B60W 10/188* (2013.01); *B60W 10/192* (2013.01); *B60W 20/00* (2013.01); *B60W 30/18127* (2013.01); *F16D 65/14* (2013.01); *H02P 3/04* (2013.01); *B60L 2240/80* (2013.01); *B60L 2250/26* (2013.01); *B60T 2270/604* (2013.01); *H02J 7/1446* (2013.01); *Y02T 10/6217* (2013.01); *Y02T 10/6239* (2013.01); (Continued)

(58) Field of Classification Search
USPC ........ 180/65.1, 65.21, 65.29, 65.285; 701/22; 303/152
See application file for complete search history.

(56) References Cited

U.S. PATENT DOCUMENTS

| | | | | |
|---|---|---|---|---|
| 6,910,747 B2 * | 6/2005 | Tsunehara | .................... | 303/152 |
| 6,930,405 B2 * | 8/2005 | Gunji | .......................... | 290/40 C |
| 6,959,971 B2 * | 11/2005 | Tsunehara | .................... | 303/152 |
| 8,054,016 B2 * | 11/2011 | Gottemoller et al. | ......... | 318/380 |
| 2004/0090116 A1 | 5/2004 | Tsunehara | | |
| 2004/0108771 A1 | 6/2004 | Tsunehara | | |

(Continued)

FOREIGN PATENT DOCUMENTS

DE 10 2006 055 766 A1 10/2007
EP 1 428 738 A2 6/2004
(Continued)

*Primary Examiner* — Christopher Schwartz
(74) *Attorney, Agent, or Firm* — Oliff PLC

(57) ABSTRACT

A brake system includes: (a) a first brake device including a first actuator and a first brake that utilizes an output of the first actuator; (b) a second brake device including a second actuator and a second brake that utilizes an output of the second actuator; (c) a regenerative-electric-energy obtaining device configured to obtain a regenerative electric energy that is returned to a power source device; and (d) an actuator control device configured to reduce a total consumed electric energy, by controlling the first actuator and/or the second actuator in a manner that maintains a state in which a required braking force is satisfied by a braking force of the first brake and/or a braking force of the second brake, such that the total consumed electric energy is made smaller when a regenerative electric energy is small, than when the regenerative electric energy is large.

18 Claims, 21 Drawing Sheets

(51) Int. Cl.

| | |
|---|---|
| *B60K 6/445* | (2007.10) |
| *B60T 1/10* | (2006.01) |
| *B60T 8/172* | (2006.01) |
| *B60T 13/58* | (2006.01) |
| *B60T 13/68* | (2006.01) |
| *B60W 10/188* | (2012.01) |
| *B60W 10/192* | (2012.01) |
| *B60W 20/00* | (2006.01) |
| *B60W 30/18* | (2012.01) |
| *B60L 7/26* | (2006.01) |
| *H02P 3/04* | (2006.01) |
| *B60L 1/00* | (2006.01) |
| *B60L 11/12* | (2006.01) |
| *B60L 11/14* | (2006.01) |
| *B60L 11/18* | (2006.01) |
| *B60L 15/20* | (2006.01) |
| *F16D 65/14* | (2006.01) |
| *H02J 7/14* | (2006.01) |

(52) U.S. Cl.
CPC ............ *Y02T 10/642* (2013.01); *Y02T 10/7005* (2013.01); *Y02T 10/7066* (2013.01); *Y02T 10/7077* (2013.01); *Y02T 10/7275* (2013.01); *Y02T 10/92* (2013.01)

(56) References Cited

U.S. PATENT DOCUMENTS

| | | | |
|---|---|---|---|
| 2004/0256911 | A1 | 12/2004 | Hatano et al. |
| 2006/0102394 | A1* | 5/2006 | Oliver ........................ 180/65.2 |
| 2009/0069149 | A1* | 3/2009 | Okumura et al. ............. 477/28 |

FOREIGN PATENT DOCUMENTS

| | | |
|---|---|---|
| JP | A-2002-542986 | 12/2002 |
| JP | A-2004-155390 | 6/2004 |
| JP | A-2004-351965 | 12/2004 |
| WO | 2008/032180 A2 | 3/2008 |

* cited by examiner

BRAKE SYSTEM AND ACTUATOR CONTROL DEVICE

TECHNICAL FIELD

The present invention relates to a brake system including actuators each of which is to be activated by supply of an electric power from a power source device.

BACKGROUND ART

Patent Documents 1-3 disclose brake systems each including (i) a hydraulic friction brake device configured to restrict wheel rotation by causing a frictional engagement member to be pressed against a brake rotary body by hydraulic pressure of a brake cylinder and (ii) an electric friction brake device configured to restrict wheel rotation by causing a frictional engagement member to be pressed against a brake rotary body by drive force of an electric motor that serves as a brake motor.

In the brake system disclosed in Patent Document 2, the electric friction brake device and the hydraulic friction brake device are both provided for each front wheel while the electric friction brake device is provided for each rear wheel. The hydraulic friction brake device provided for each front wheel is activated by hydraulic pressure of a master cylinder, and braking force of the electric friction brake device is controlled such that a sum of braking forces of the hydraulic friction brake device and electric friction brake device becomes close to a target value that is determined depending on an operational state of a brake operating member operated by a vehicle driver.

In the brake system disclosed in Patent Document 3, electric energy acquired in an electric motor (referred to as a regenerative motor) that is connected to each wheel is directly supplied to a brake motor of the electric friction brake device or returned to a battery. That is, the electric energy is suppliable to the brake motor from the regenerative motor or from the battery. When the supply of the electric energy from the regenerative motor to the brake motor is insufficient, the electric energy is supplied from the battery to the brake motor.

PRIOR ART DOCUMENTS

Patent Documents

[Patent Document 1] JP-2002-542986A
[Patent Document 2] JP-2004-351965A
[Patent Document 3] JP-2004-155390A

DISCLOSURE OF THE INVENTION

Object to be Achieved by the Invention

An object of the present invention is to improve an actuator control device configured to control a plurality of actuators each of which is to be activated by electric energy supplied thereto from a power source device. Specifically described, the object is to restrain voltage drop in the power source device, by maintaining balance between generation and consumption of the electric energy in the power source device when controlling the actuators.

Measures for Achieving the Object and Effect

The present invention is, in an actuator control device configured to control a plurality of actuators each of which is to be activated by an electric energy supplied thereto from a power source device, to control at least one of the plurality of actuators such that a total consumed electric energy including the electric energies consumed individually by the actuators is made smaller when a regenerative electric energy as the electric energy returned to the power source device is small, than when the regenerative electric energy is large.

That is, the at least one of the plurality of actuators is controlled based on the regenerative electric energy, such that the total consumed electric energy is controlled to a value suitable for the regenerative electric energy. Thus, the balance between generation and consumption of the electric energy in the power source device is maintained whereby voltage drop can be hardly caused in the power source device.

Further, in the actuator control device according to the present invention, the total consumed electric energy is made smaller when the regenerative electric energy returned to the power source device is small, than when the regenerative electric energy is large, so that the voltage drop in the power source can be more reliably prevented, in comparison with an arrangement where the total power consumption is controlled based on the voltage in the power source device. Further, the voltage in the power source device can be stabilized.

The actuator control device is applicable to a brake system, so as to be used as a control device configured to control actuators included in the brake system.

In the brake system disclosed in Patent Document 3, the electric energy consumed in each brake motor is not changed as long as the situation is not changed (for example, as long as a target braking force of the electric friction brake device is not changed), irrespective of whether the regenerative electric energy returned from the regenerative motor to the battery is large or small. Further, in a regenerative cooperative control, when a large regenerative braking force is applied to each wheel by the regenerative motor, there is not so high need that a large electric friction braking force has to be applied to each wheel by the brake motor so that the consumed electric energy may be small. Therefore, the electric energy supplied from the battery to the brake motor becomes small while the electric energy returned from the regenerative motor to the battery becomes large. On the other hand, when the electric energy acquired in the regenerative motor is small, the electric energy consumed by the brake motor becomes large. The electric energy supplied from the battery to the brake motor becomes large while the electric energy returned from the regenerative motor to the battery becomes small.

Thus, in Patent Document 3, there is no description that suggests maintaining a balance between generation and consumption of electric energy in the battery.

Claimable Inventions

There will be described inventions deemed to be claimable or features contained in the inventions.

(1) A brake system characterized by comprising:
a first brake device including: a first actuator that is at least one actuator to be activated by supply of an electric energy from a power source device installed in a vehicle; and a first brake configured to restrict rotation of a first wheel that is at least one of a plurality of wheels of the vehicle, by utilizing an output of said first actuator;
a second brake device including: a second actuator that is at least one actuator to be activated by supply of the electric energy from the power source device; and a second brake configured to restrict rotation of a second wheel that is at least one of the plurality of wheels which is other than the first wheel, by utilizing an output of said second actuator;

a regenerative-electric-energy obtaining device configured to obtain a regenerative electric energy that is the electric energy returned to the power source device; and an actuator control device configured to reduce a total consumed electric energy including the electric energy consumed individually by said first actuator and the electric energy consumed individually by said second actuator, by controlling at least at least one of said first actuator and said second actuator in a manner that maintains a state in which a required braking force is satisfied by at least one of a first braking force and a second braking force that are a braking force of said first brake and a braking force of said second brake, respectively, such that the total consumed electric energy is made smaller when the regenerative electric energy obtained by said regenerative-electric-energy obtaining device is small, than when the regenerative electric energy obtained by said regenerative-electric-energy obtaining device is large.

Each of the first and second brakes may be a friction brake that is configured to restrict rotation of a corresponding one of the first and second wheels, by causing a frictional engagement member to be pressed, by a pressing device, against a brake rotary body rotatable integrally with the corresponding one of the first and second wheels. Where each of the first and second brakes is the friction brake, the required braking force may be referred to as a required friction braking force.

Where each of the first and second brakes is a friction brake, each of the first and second brakes may be either a hydraulic friction brake (hereinafter abbreviated to as a hydraulic brake where appropriate) and an electric friction brake (hereinafter abbreviated to as an electric brake where appropriate). In the hydraulic friction brake, the frictional engagement member is pressed against the brake rotary body by a hydraulic pressure. In the electric friction brake, the frictional engagement member is pressed against the brake rotary body by an electric actuator.

The power source device includes at least one electric power source. The electric power source may be a battery or the like that is capable of recharging and discharging an electric energy, and may be lithium ion battery, nickel hydride battery or lead battery, for example. Further, the power source device may include a plurality of batteries such as a main battery and an auxiliary battery, so that an electric energy is supplied from the main battery to the auxiliary battery, and the electric energy of the auxiliary battery can be utilized by a plurality of actuators. In this case, the actuators may be controlled based on the regenerative electric energy returned to the main battery or based on the regenerative electric energy returned to the auxiliary battery. When the regenerative electric energy returned to the main battery is large, the electric energy supplied to the auxiliary battery can be increased.

When the electric energy returned to the power source device is small, if the total consumed electric energy becomes large, there is a risk that the electric voltage of the power source device could be dropped. On the other hand, when the regenerative electric energy is large, even if the total consumed electric energy becomes large, the voltage drop is hardly caused. In view of this, in the brake system described in the present mode, at least one of the first and second actuators is controlled, for example, such that the total consumed electric energy is made smaller when the regenerative electric energy returned to the power source device is smaller than the given electric energy, than when the regenerative electric energy returned to the power source device is not smaller than the given electric energy, and such that the required braking force is maintained. Consequently, it is possible to restrain voltage drop in the power source device while maintaining the required braking force. It is noted that there is a case where, in addition to at least one of the first and second actuators, another actuator, which influences an amount of the total consumed electric energy, is controlled.

The electric energy generated by a generator is returned to the power source device. The generator may be provided with a function serving as an electric driving motor, or may be adapted to be activated by utilizing engine rotation or the like. In the former case, the brake system is applicable to a hybrid vehicle or an electric vehicle. In the latter case, the brake system is applicable to an engine driving vehicle.

(2) The brake system according to mode (1), comprising a regenerative brake device which is configured to convert a kinetic energy of at least one electric driving motor, into the electric energy, and to return the electric energy to the power source device, said regenerative brake device being configured to apply a regenerative braking force to a drive wheel that is at least one of the first and second wheels, the at least one electric driving motor being connected to the drive wheel.

(3) The brake system according to mode (2), wherein said regenerative-electric-energy obtaining device includes a regenerative-braking-force-based obtaining portion that is configured to obtain the regenerative electric energy, based on the regenerative braking force applied to the drive wheel by said regenerative brake device.

The power source device includes at least one battery. For example, an alternating current generated in the driving motor is converted into a direct current by an inverter, and is converted into a desired voltage level by a converter, so as to be stored in the battery. The driving motor is controlled such that the regenerative braking force applied to the drive wheel becomes close to a required regenerative braking force. The regenerative electric energy returned to the power source device is made larger when the regenerative braking force is large, than when the regenerative braking force is small. Therefore, the regenerative electric energy returned to the power source device can be obtained based on the regenerative braking force.

It is also possible to obtain the regenerative electric energy, for example, based on an operational state of the inverter or converter, or based on an electric current inputted to the battery.

Further, there is also a case where the alternating current generated in the electric driving motor is supplied to the actuator via the inverter and converter. In this case, too, it can be considered that the electric energy is returned to the power source device and is supplied to the actuator.

(4) The brake system according to any one of modes (1)-(3), wherein said actuator control device includes a saving-energy-type actuator controlling portion that is configured to reduce the total consumed electric energy, by increasing the electric energy consumed in said first brake device and reducing the electric energy consumed in said second brake device, such that the total consumed electric energy is made smaller when the regenerative electric energy is small than when the regenerative electric energy is large.

(5) The brake system according to mode (4),
wherein said first brake device includes a first-braking-force controlling actuator which is other than said first actuator and which is configured to control the first braking force, wherein said second brake device is an electric friction brake device that is configured to restrict the rotation of the second wheel by causing a frictional engagement member to be pressed against a brake rotary body by a pressing force corresponding to the output of said second actuator, and wherein said saving-energy-type actuator controlling portion includes a first-braking-force increasing portion that is configured to increase the first braking force by increasing the electric energy consumed by said first-braking-force controlling actuator, and to reduce the second braking force by reducing the electric energy consumed by said second actuator, such that the first braking force and the second braking force are respectively made larger and smaller when the regenerative electric energy is smaller than the given electric energy, than when the regenerative electric energy is not smaller than the given electric energy.

Even when the second braking force is made smaller by reduction of the electric energy consumed by the second actuator, if the first braking force is made large by increase of the electric energy consumed by the first-braking-force controlling actuator, the required braking force can be satisfied by cooperation of the first braking force and the second braking force.

The reduction of the electric energy consumed by the second actuator may be realized (i) by reducing the electric energy consumed by the second actuator in a state in which the electric energy is already being consumed by the second actuator, (ii) by not consuming a projected amount of the electric energy which had been projected to be consumed by the second actuator (for example, by delaying start of activation of the second actuator), or (iii) by reducing a projected increase rate of the electric energy which had been projected to be consumed by the second actuator (for example, by restraining or reducing the increase rate).

Examples of the reduction of the consumed electric energy will be described later.

(6) The brake system according to mode (4) or (5), wherein said first-braking-force controlling actuator is configured to increase the first braking force with increase of the electric energy supplied to said first-braking-force controlling actuator, such that the first braking force is increased by a magnitude as the electric energy supplied to said first-braking-force controlling actuator is increased by an amount that is smaller than an amount by which the electric energy supplied to said second actuator is to be increased when the second force is required to be increased by the same magnitude.

Where the electric energies supplied to the first-braking-force controlling actuator and the second actuator are increased by the same amount, the increased magnitude $\Delta B1$ of the first braking force is larger than the increased magnitude $\Delta B2$ of the second braking force ($\Delta B1 > \Delta B2$). Therefore, where the second braking force is reduced by $\Delta B2$ with reduction of the electric energy supplied to the second actuator by $\Delta E2$ while the first braking force is increased by $\Delta B1$ with increase of the electric energy supplied to the first-braking-force controlling actuator by $\Delta E1$, a relationship between $\Delta E1$ and $\Delta E2$ and a relationship between $\Delta B1$ and $\Delta B2$ are represented by $|\Delta E1| < |\Delta E2|$, $|\Delta B1| > |\Delta B2|$. Therefore, it is possible to reduce the total consumed electric energy including the electric energies consumed by the first-braking-force controlling actuator and the second actuator, while keeping a sum of the first and second braking forces unchanged.

Further, even without reducing the electric energy consumed by the first actuator, it is possible to reduce the total consumed electric energy including the electric energies consumed individually by the first actuator, the first-braking-force controlling actuator and the second actuator, while keeping the sum of the first and second braking forces unchanged, by reducing the electric energy consumed by the second actuator and increasing the electric energy consumed by the first-braking-force controlling actuator.

(7) The brake system according to any one of modes (1)-(6), wherein said actuator control device includes a saving-energy-type actuator controlling portion that is configured to reduce at least at least one of the electric energy consumed individually by said first actuator and the electric energy consumed individually by said second actuator, such that said at least one of the electric energy consumed individually by said first actuator and the electric energy consumed individually by said second actuator is smaller when the regenerative electric energy is smaller than a given electric energy, than when the regenerative electric energy is not smaller than the given electric energy.

It is often that reduction of the electric energy consumed by the actuator corresponds to reduction of the output (torque) of the actuator. In this case, the saving-energy-type actuator controlling portion may be referred to as a torque-reducing-type actuator controlling portion.

(8) The brake system according to any one of modes (1)-(7), wherein said actuator control device includes a saving-energy-type actuator controlling portion that is configured to reduce at least at least one of the electric energy consumed individually by said first actuator and the electric energy consumed individually by said second actuator when at least one of the electric energy consumed individually by said first actuator and the electric energy consumed individually by said second actuator is larger than a given individual electric energy that is determined depending on at least the regenerative electric energy.

The given individual electric energy is obtained based on at least the regenerative electric energy, and may be obtained, for example, based on the regenerative electric energy and an electric voltage of the power source device.

(9) The brake system according to any one of modes (1)-(8), wherein said actuator control device includes a saving-energy-type actuator controlling portion that is configured to reduce at least at least one of the electric energy consumed individually by said first actuator and the electric energy consumed individually by said second actuator when it is predicted that the total consumed electric energy will become larger than a given total consumed electric energy that is determined depending on at least the regenerative electric energy.

The given total consumed electric energy may be an upper limit value of the total consumed electric energy, which is considered to hardly cause a voltage drop of the power source device.

The conditions, which are to be satisfied for causing the saving-energy-type actuator controlling portion to reduce at least the electric energy consumed individually by the first actuator and/or the electric energy consumed individually by the second actuator, in modes (7)-(9) are: (i) condition that the regenerative electric energy is smaller than the given electric energy; (ii) condition that the individually-consumed electric energy is larger than the given individual electric energy that is determined depending on the regenerative electric energy; and (iii) condition that it is predicted that the total consumed electric energy becomes larger than the given total consumed electric energy that is determined depending on the regenerative electric energy. There are cases where these conditions relate to one another. For example, where the first actuator is switchable between ON and OFF states, and the electric energy consumed in the ON state is roughly known, the conditions (ii) and (iii) can be satisfied when the condition (i) is satisfied.

Further, it is also possible to cause the saving-energy-type actuator controlling portion to reduce at least the electric energy consumed individually by the first actuator and/or the electric energy consumed individually by the second actuator, when at least two of the three conditions (i), (iii) are satisfied.

(10) The brake system according to any one of modes (7)-(9), wherein said saving-energy-type actuator controlling portion includes an activation-start delaying portion that is configured to delay start of activation of one of said first actuator and said second actuator.

(10-1) Reduction of Instantaneous Current

For example, where the electric current is instantaneously increased due to an inrush current (that may be referred to as a starting current) that flows upon start of activation of each of the first and second actuators, the total consumed electric energy is instantaneously increased by a considerably increased amount if the first and second actuators are concurrently started to be activated.

However, even when the first and second actuators are both commanded to be started, it is possible to avoid the inrush currents from flowing concurrently, by staring activation of one of the two actuators later than activation of the other of the two actuators. In this case, the one of the two actuators, whose activation is to be started at a delayed point of time, may be a predetermined one of the two actuators. For example, the one of the two actuators may be one of the actuators which has a lower priority than the other.

Further, when one of the first and second actuators is commanded to be started in a state in which a large amount of the electric current is caused to flow by activation of the other of the two actuators which has been started earlier, it is possible to start activation of the one of the two actuators after the electric current flowing through the other of the two actuators has become small.

It is noted that the similar effect can be obtained also where the one of the two actuators, which is started later than the other, is of a type in which an inrush current does not flow.

(10-2) Reduction of Steady Current

It is possible to cause one of the actuators to start its activation after the other of the actuators has been stopped as a result of satisfaction of a termination condition, where the other of the actuators is activated from satisfaction of a start condition until satisfaction of the termination condition. Consequently, the total consumed electric energy can be reduced.

It is noted that, when the one of the actuators is commanded to be started rapidly, it is possible to alleviate the termination condition of the other of the actuators (i.e., modify the condition such that the termination condition can be easily satisfied), so that the activation of the other of the actuators is stopped at an earlier point of time.

(11) The brake system according to any one of modes (1)-(10), wherein said actuator control device includes a torque-limiter-type actuator controlling portion that is configured to restrict the output of at least one of said first actuator and said second actuator, such that the output of said at least one of said first actuator and said second actuator is made smaller when the regenerative electric energy is smaller than a given electric energy, than when the regenerative electric energy is larger than the given electric energy.

The output of each of the first and second actuators is increased with increase of the consumed electric energy. Therefore, the consumed electric energy is made small when the output is made small.

(11-1) Reduction of Instantaneous Current

There will be described a case where an inrush current flows in one of the first and second actuators upon start of its activation while the electric current supplied to the other of the first and second actuators is controllable (so as to reduce the inrush current).

For example, when the activation of one of the actuators is started in a state in which the other of the actuators is being activated, the output of the other of the actuators is made smaller than when the one of the actuators is in its non-activated state, if the regenerative electric energy is smaller than the given electric energy. In this case, the output of the other of the actuators can be made smaller, for example, by restricting a rate of increase of the output of the other of the actuators where the output of the other of the actuators is increased.

Further, in a state in which a large amount of the electric current is flowing through one of the actuators, when the other of the actuators is commanded to be started, the output of the other of the actuators is restricted.

It is possible to reduce the output of the other of the actuators in such a manner that causes the total consumed electric energy to be made smaller than an upper limit value that is determined depending on the regenerative electric energy.

(11-2) Reduction of Steady Current

For example, where one of the actuators is activated during a period from satisfaction of the start condition until satisfaction of the termination condition, the output of the other of the actuators is reduced until the termination condition of the one of the actuators is satisfied.

(12) The brake system according to mode (11), wherein said torque-limiter-type actuator controlling portion includes an increase-rate restricting portion that is configured to restrict a rate of increase of the output of said at least one of said first actuator and said second actuator.

(13) The brake system according to any one of modes (1)-(12), wherein said actuator control device includes an activation-state second-actuator power-consumption reducing portion that is configured to reduce the electric energy consumed individually by said second actuator, such that the electric energy consumed individually by said second actuator is smaller when the regenerative electric energy is smaller than a given electric energy and said first actuator is activated, than when the regenerative electric energy is not smaller than the given electric energy and/or said first actuator is in a non-activated state.

In the brake system described in this mode, a priority is given to activation of the first actuator while activation of the second actuator is restricted. For example, where the first wheel is a front wheel while the second wheel is a rear wheel, the activation of the second actuator of the brake device provided for the rear wheel is restricted because it is preferable that the braking force applied to the front wheel is made large.

Where the first actuator is activated during a period from satisfaction of the start condition until satisfaction of the termination condition, it is possible to employ (i) an arrangement in which the activation of the second actuator is started after the termination condition of the first actuator is satisfied, when a command requesting start of the activation of the second actuator is issued before the termination condition of the first actuator is satisfied, or (ii) an arrangement in which the electric energy consumed by the second actuator is reduced or the activation of the second actuator is stopped, when the activation of the first actuator is started during the activated state of the second actuator.

(14) The brake system according to mode (13), wherein said activation-state second-actuator power-consumption reducing portion includes a portion that is configured to reduce the electric energy consumed individually by said second actuator when the electric energy consumed individually by said first actuator is larger than a given individual electric energy that is determined depending on the regenerative electric energy.

There is not so high need to reduce the electric energy consumed individually by the second actuator, when the electric energy consumed individually by the first actuator is small even if the regenerative electric energy is small. However, when the regenerative electric energy is small and the electric energy consumed individually by the first actuator is not smaller than the given individual electric energy, it can be considered that the need to reduce the electric energy consumed individually by the second actuator is high.

Where the first actuator is to be activated by the electric energy that is not smaller than the given individual electric energy, it can be considered that the need to reduce the electric energy consumed individually by the second actuator is high, when the regenerative electric energy is small and the first actuator is in the activated state.

(15) The brake system according to any one of modes (1)-(14), wherein said actuator control device includes a first-actuator priority controlling portion that is configured to restrict the output of said second actuator without restricting the output of said first actuator, such that the output of said second actuator is smaller when the regenerative electric energy is smaller than a given electric energy, than when the regenerative electric energy is not smaller than the given electric energy.

The first actuator is activated with a higher priority being given to the first actuator rather than to the second actuator.

(16) The brake system according to any one of modes (1)-(15), wherein said actuator control device includes an upper-limit-value-based controlling portion that is configured to control at least one of said first actuator and said second actuator in a manner that maintains a state in which the total consumed electric energy is smaller than an upper limit value that is determined depending on the regenerative electric energy.

The voltage drop in the power source device can be satisfactorily restrained because the total consumed electric energy is avoided from being made larger than the upper limit value.

(17) The brake system according to any one of modes (1)-(16), wherein said actuator control device includes an activation-predicted-state second-actuator power-consumption reducing portion that is configured to reduce the electric energy consumed individually by said second actuator, such that the electric energy consumed individually by said second actuator is smaller when the regenerative electric energy is smaller than a given electric energy and a probability that activation of said first actuator will be started is high, than when the regenerative electric energy is not smaller than the given electric energy and/or the probability that the activation of said first actuator will be started is low.

The total consumed electric energy can be satisfactorily reduced, by reducing the electric energy consumed by the second actuator when the probability of activation of the first actuator is high.

It can be considered that there is a high probability that the activation of the first actuator will be started, for example, in case of satisfaction of a start-prediction condition that is close to the start condition of the first actuator.

(18) The brake system according to any one of modes (1)-(17), wherein the first wheel is each of front left and right wheels of the vehicle while the second wheel is each of rear left and right wheels of the vehicle.

It is preferable that the braking force applied to the front wheel, rather than that applied to the rear wheel, is made large, from point of view of running stability upon braking of the vehicle. Further, since a load moves toward the front wheel upon braking of the vehicle, it is possible to effectively increase a total braking force applied to the vehicle, by increasing a brake activation force applied to the front wheel. Therefore, when the regenerative electric energy is small, it is preferable that the first brake device is activated with a higher priority being given to the first brake device.

It is possible to employ either an arrangement in which the electric brake is provided for every one of the front left and right wheels and rear left and right wheels, or an arrangement in which the hydraulic brake is provided for each of the front left and right wheels while the electric brake is provided for each of the rear left and right wheels. It is preferable that the hydraulic brake is provided for each front wheel rather than for each rear wheel, because the hydraulic brake has a better fail-safe property.

Further, the drive wheel may be each of the front left and right wheel, each of the rear left and right wheels or each of the four wheels (i.e., each of the front left/right and rear left/right wheels).

(19) The brake system according to any one of modes (1)-(18), wherein said first brake device includes: (a) a brake cylinder; (b) a hydraulic brake that is configured to restrict rotation of the first wheel by pressing a frictional engagement member against a brake rotary body rotatable integrally with the first wheel; (c) a high pressure source that is to be activated by the electric energy supplied thereto from the power source device, so as to supply a highly pressurized working fluid to said brake cylinder; and (d) a brake-hydraulic-pressure controlling portion that is to be activated by the electric energy supplied thereto from the power source device, so as to control hydraulic pressure of said brake cylinder by utilizing hydraulic pressure of said high pressure source, wherein said high pressure source includes: (1) an accumulator that is configured to store therein the working fluid such that the stored working fluid is pressurized; (ii) a pump that is connected to said accumulator; (iii) an electric pump motor that is configured to drive said pump; and (iv) a pump-motor controlling portion that is configured to control said pump motor such that hydraulic pressure of the working fluid stored in said accumulator is held in a given range, and wherein said brake-hydraulic-pressure controlling portion includes: (x) a pressure-increasing control valve that is disposed at least between said brake cylinder and said high pressure source; and (y) a solenoid controlling portion that is configured to control hydraulic pressure of said brake cylinder, by controlling the electric energy supplied from the power source device to a solenoid of said pressure-increasing control valve.

In the brake system described in this mode, the hydraulic brake serves as the first brake, the electric pump motor serves as the first actuator, and the pressure-increasing control valve serves as the first-braking-force controlling actuator.

Further, the first brake may be either a drum brake or a disk brake.

The activation of the pump motor is started when the hydraulic pressure of the working fluid stored in the accumulator becomes lower than a lower limit of the given range, and is stopped when it becomes higher than an upper limit value of the given range. If the hydraulic pressure of the working fluid stored in the accumulator becomes considerably low, it becomes difficult to rapidly increase the hydraulic pressure of the brake cylinder. Therefore, it is important that the hydraulic pressure of the working fluid stored in the accumulator is held higher than the lower limit value of the given range.

Where the capacity of the accumulator is large, frequency of the activation of the pump motor is made low, thereby reducing probability of the activation of the pump motor (i.e., first actuator) concurrently with the activation of the second actuator, and hardly causing a voltage drop. However, the large capacity of the accumulator problematically leads to a large size of the accumulator and a large size of the brake system.

On the other hand, if the accumulator is constructed compact in size, frequency of the activation of the pump motor is made high, thereby increasing probability of the activation of the pump motor concurrently with the activation of the second actuator. Further, the increase of the frequency of the activation of the pump motor (i.e., increased number of times of starting and stopping of the activation of the pump motor) leads to a problem such as reduction of the service life of the pump motor.

However, in the brake system described in this mode, the actuator is controlled in a manner that maintains the balance between generation and consumption of the electric energy in the power source device, so that it is possible to hardly cause the voltage drop in the power source device. Further, each of the pump motor and a drive circuit (switch circuit) improved the performance and prolonged the service life.

Thus, in the brake system described in this mode, it is possible to make the accumulator be constructed compact in size and to make the voltage drop be hardly caused in the power source device.

(20) The brake system according to mode (19), wherein said pump-motor controlling portion includes an upper-limit-value changing portion that is configured to change an upper limit value of the given range, such that the upper limit value is reduced by at least a given value when the regenerative electric energy obtained by said regenerative-electric-energy obtaining device is smaller than a given electric energy.

The pump motor is stopped at an earlier point of time when the upper limit value of the given range is reduced, than the upper limit value is kept high. This makes it possible to recover the output of the second actuator earlier.

(21) The brake system according to mode (19) or (20), wherein said pump-motor controlling portion includes a switch circuit that is configured to switch said pump motor between an activated state and a stopped state.

The pump motor is subjected to ON-OFF control. It is often that an inrush current flows upon switching from OFF to ON.

Where the pump motor is connected to a drive circuit that is capable of controlling an amount of electric current supplied to the pump motor, or where the pump motor is connected to a circuit including a resistance that is capable of restraining an inrush current, it is possible to reduce the inrush current flowing through the pump motor.

(22) The brake system according to any one of modes (1)-(21), wherein said second brake device includes: (a) an electric brake motor that is said second actuator to be activated by the electric energy supplied from the power source device; (b) a motion converting mechanism that is configured to convert a rotary motion of an output shaft of said brake motor into a linear motion of a pressing member; (c) an electric friction brake that is said second brake configured to restrict the rotation of the second wheel, by causing a frictional engagement member to be pressed against a brake rotary body rotatable integrally with the second wheel by a forward force of said pressing member; and (d) a brake-motor controlling portion that is configured to control the electric energy supplied from the power source device to said brake motor so as to control a pressing force by which said frictional engagement member is to be pressed against said brake rotary body.

The electric friction brake device, which does not require the high pressure source and piping or the like, can be constructed more compact in size, as compared with the hydraulic friction brake device. Thus, the electric friction brake device has an advantage of better instability into the vehicle.

The brake motor may be connected to a drive circuit that is capable of continuously controlling the electric current supplied to the brake motor, so that the pressing force can be continuously controlled. Further, it is possible to reduce the inrush current. It is noted that the brake motor may be arranged to be subjected to ON-OFF control, too.

(23) The brake system according to any one of modes (1)-(22), wherein said actuator control device includes a cooperative controlling portion that is control at least one of said first actuator and said second actuator in a manner that maintains a state in which the required braking force is satisfied by at least one of the first braking force and the second braking force.

The required braking force may be a required total braking force that is determined based on an operational state of a brake operating member operated by a driver of the vehicle, or may be a required friction braking force that is obtained by subtracting an actual regenerative braking force from the required total braking force.

Both of the first and second actuators may be brake motors. In this case, at least one of the first and second actuators is controlled such that the required braking force is satisfied by the braking force applied to the front wheel and the braking force applied to the rear wheel.

Further, where the first brake device includes the first-braking-force controlling actuator, at least one of the first-braking-force controlling actuator and the second actuator is controlled.

(24) A brake system characterized by comprising:
a first brake device including: a first actuator that is at least one actuator to be activated by supply of an electric energy from a power source device installed in a vehicle; and a first brake configured to restrict rotation of a first wheel that is at least one of a plurality of wheels of the vehicle, by utilizing an output of said first actuator;
a second brake device including: a second actuator that is at least one actuator to be activated by supply of the electric energy from the power source device; and a second brake configured to restrict rotation of a second wheel that is at least one of the plurality of wheels which is other than the first wheel, by utilizing an output of said second actuator;
a regenerative-electric-energy obtaining device configured to obtain a regenerative electric energy that is the electric energy returned to the power source device; and
an actuator control device configured to control at least one of said first actuator and said second actuator in a manner that maintains a state in which a total consumed electric energy including the electric energy consumed individually by said first actuator and the electric energy consumed individually by said second actuator is made smaller when the regenerative electric energy obtained by said regenerative-electric-energy obtaining device is small, than when the regenerative electric energy obtained by said regenerative-electric-energy obtaining device is large.

The technical features described in any one of modes (1)-(23) can be employed in the brake system described in this mode.

(25) A brake system characterized by comprising:

a first brake device including: a first actuator that is at least one actuator to be activated by supply of an electric energy from a power source device installed in a vehicle; and a first brake configured to restrict rotation of a first wheel that is at least one of a plurality of wheels of the vehicle, by utilizing an output of said first actuator;

a second brake device including: a second actuator that is at least one actuator to be activated by supply of the electric energy from the power source device; and a second brake configured to restrict rotation of a second wheel that is at least one of the plurality of wheels which is other than the first wheel, by utilizing an output of said second actuator;

a regenerative-electric-energy obtaining device configured to obtain a regenerative electric energy that is the electric energy returned to the power source device; and an actuator control device configured to control said second actuator, such that the electric energy consumed by said second actuator is smaller when the regenerative electric energy obtained by said regenerative-electric-energy obtaining device is smaller than a given electric energy and said first actuator is in an activated state, than when the regenerative electric energy is not smaller than the given electric energy and/or said first actuator is not in the activated state.

In the brake system described in this mode, a priority is given to activation of the first actuator, so that the electric energy consumed individually by the second actuator is reduced whereby the total consumed electric energy is reduced.

Thus, the first actuator can be activated substantially equally irrespective of whether or not the regenerative electric energy is smaller than the given electric energy.

It is preferable that the first wheel is each of the front left and right wheels while the second wheel is each of the rear left and right wheels. A higher priority is given to the braking of each front wheel than to the braking of each rear wheel.

The technical features described in any one of modes (1)-(24) can be employed in the brake system described in this mode.

(26) An actuator control device which is to be connected to a power source device installed in a vehicle, and which is configured to control a plurality of actuators that are to be activated by supply of an electric energy from the power source device, the vehicle including a regenerative brake device that is configured to convert a kinetic energy of at least one electric driving motor, into the electric energy, and to return the electric energy to the power source device, the regenerative brake device being configured to apply a regenerative braking force to at least one drive wheel of the vehicle, the at least one electric driving motor being connected to the at least one drive wheel, said actuator control device being characterized by comprising:

a regenerative-electric-energy obtaining device configured to obtain a regenerative electric energy that is the electric energy returned to the power source device; and a saving-energy-type actuator controlling portion that is configured to control at least one of the plurality of actuators in a manner that maintains a state in which a total consumed electric energy including the electric energies consumed individually by the plurality of actuators is made smaller when the regenerative electric energy obtained by said regenerative-electric-energy obtaining device is small, than when the regenerative electric energy obtained by said regenerative-electric-energy obtaining device is large.

The actuator control device described in this mode can be employed in the brake system described in any one of modes (1)-(25), and can be employed also in a system which is to be installed in a vehicle and which is other than a brake system.

(27) The actuator control device according to mode (26), wherein one of the plurality of actuators is a pump motor that is configured to drive a pump for pumping a working fluid, pressurizing the pumped working fluid, and supplying the pressurized working fluid to an accumulator, and wherein said saving-energy-type actuator controlling portion includes a selective consumed-electric-energy reducing portion that is configured to reduce the electric energy consumed by another of the plurality of actuators which is other than the pump motor without reducing the electric energy consumed by the pump motor.

Where the pump motor as the actuator and another actuator other than the pump motor are connected to the power source device, it is possible to reduce the electric energy consumed by the another actuator when reduction of the total consumed electric energy is required. It is preferable that a higher priority is given to activation of the pump when the need to store a highly pressurized working fluid in the accumulator is high.

(28) The actuator control device according to mode (26) or (27), wherein said saving-energy-type actuator controlling portion includes a consumed-electric-energy limiting portion that is configured to control at least one of the plurality of actuators in a manner that maintains a state in which the total consumed electric energy including the electric energies consumed individually by the plurality of actuators is made smaller than an upper limit value that is determined depending on the regenerative electric energy obtained by said regenerative-electric-energy obtaining device.

By maintaining balance between generation and consumption of the electric energy in the power source device, it is possible to restrain reduction of the electric energy (that may be referred to as power reserve amount) actually stored in the battery that is included in the power source device and accordingly to stabilize the electric voltage of the battery.

On the other hand, when the power reserve amount is not smaller than a given value, a large voltage drop is hardly caused even if the power reserve amount is reduced. Therefore, the upper limit value of the total consumed electric energy including the electric energies consumed individually by the plurality of actuators, may be determined based on at least the regenerative electric energy and the power reserve amount of the power source device (or the electric voltage of the power source device).

MODES FOR CARRYING OUT THE INVENTION

Hereinafter, a brake system according to an embodied form of the present invention will be described in detail with reference to drawings.

The present brake system includes an actuator control device according to an embodied form of the present invention.

Embodiment 1

Vehicle

Figure 1:
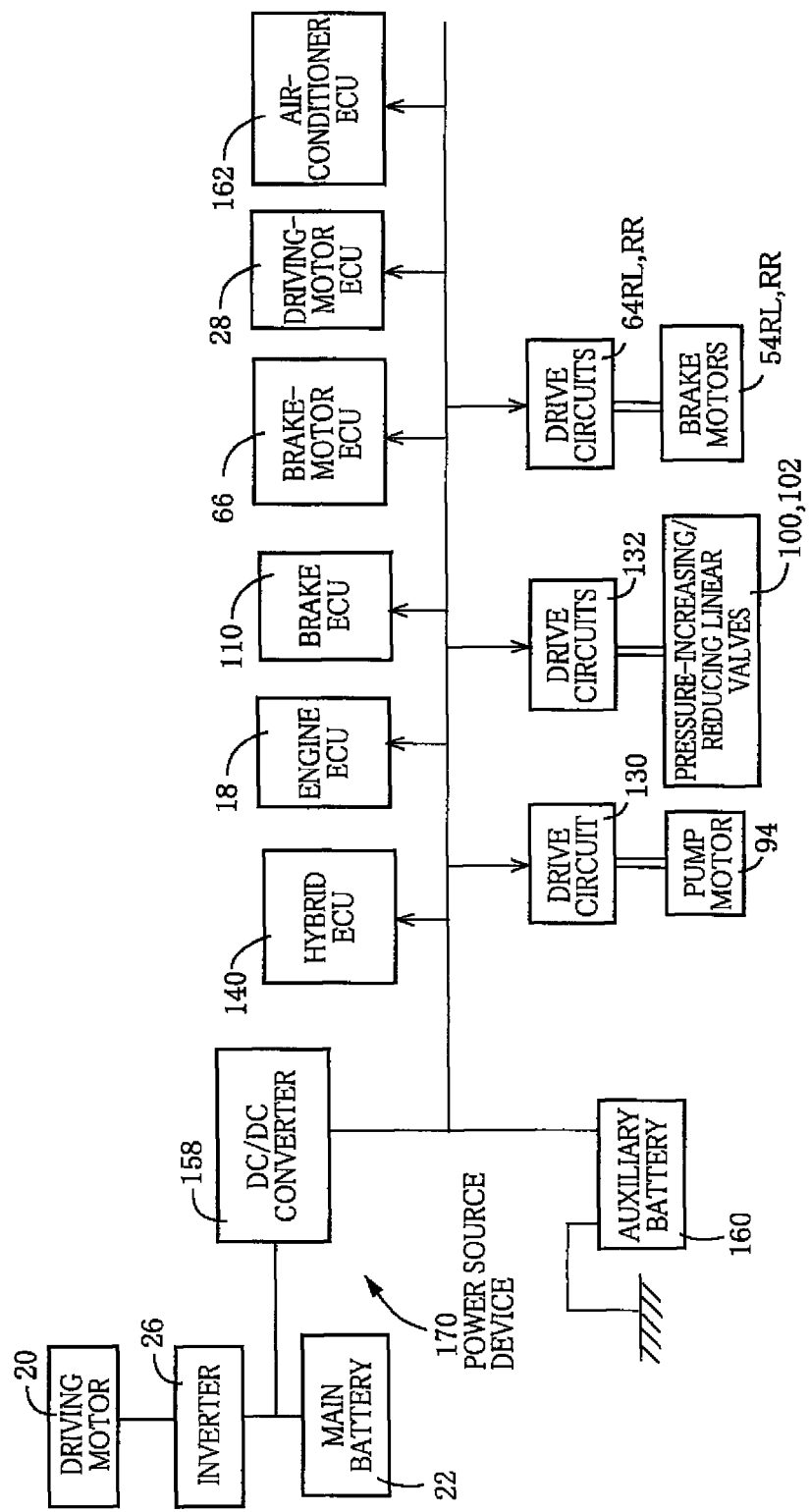
FIG. 1 is a view conceptually showing a power line of a vehicle that is equipped with a brake system according to Embodiment 1 of the present invention. The present brake system includes an actuator control device according to Embodiment 1 of the present invention.
Figure 2:
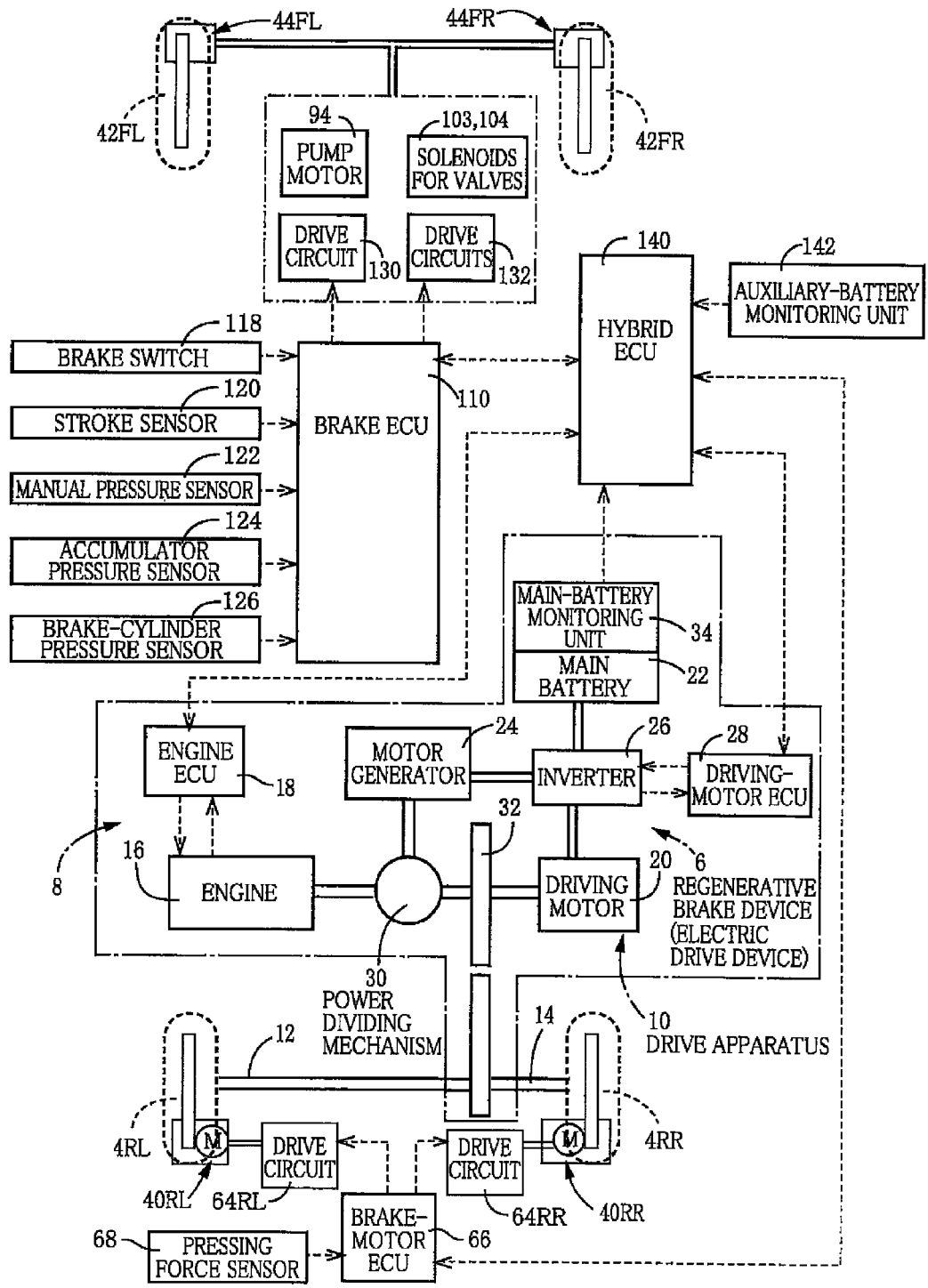
FIG. 2 is a view schematically showing an entirety of the vehicle in which the above-described brake system is installed.

The present brake system is installed in a hybrid vehicle (including also a plug-in hybrid vehicle). As shown in FIG. 2, in the hybrid vehicle, rear left and right wheels 4RL, 4RR as drive wheels are driven by a drive apparatus 10 that includes an electric drive device 6 and an internal-combustion drive device 8. A drive power of the drive apparatus 10 is transmitted to the rear left and right wheels 4RL, 4RR via drive shafts 12, 14. The internal-combustion drive device 8 includes an engine 16 and an engine ECU 18 that is configured to control activation of the engine 16. The electric drive device 6 includes an electric driving motor (hereinafter simply referred to as driving motor) 20, a main battery 22, a motor generator 24, an inverter 26, an electric driving motor ECU (hereinafter simply referred to as driving motor ECU) 28 and a power dividing mechanism 30. The engine 16, driving motor 20 and motor generator 24 are connected to the power dividing mechanism 30. There are selectively established, for example, a state in which only the drive power of the driving motor 20 is transmitted to an output member 32, a state in which a drive power of the engine 16 and the drive power of the driving motor 20 are both transmitted to the output member 32, and a state in which an output of the engine 16 is outputted to the motor generator 24 and the output member 32. The output member 32 is an element constituting a speed reducer. The drive power of the drive apparatus 10 is transmitted to the drive shafts 12, 14 via the speed reducer and differential gears.

The inverter 26 is controlled by the motor ECU 28, so as to selectively establish at least a driving state in which the driving motor 20 is rotated by supply of an electric energy the driving motor 20 from the main battery 22 and a charging state in which the driving motor 20 is caused to serve as a generator upon regenerative braking so as to return the electric energy to the main battery 22. During the charging state, a regenerative braking torque is applied to each of the rear left and right wheels 4RL, 4RR. In this sense, the electric drive device 6 may be referred also to as a regenerative brake device.

The main battery 22 may be constituted by, for example, a device including a nickel hydride battery or a device including a lithium ion battery. A main-battery monitoring unit 34 is provided for obtaining information representing a state of the main battery 22.

<Brake System>

In the following description, each of the electric motors, linear valves, drive circuit and other elements, which are provided for respective wheels, will be referred together with, as a suffix, one of reference signs (FR, FL, RR, RL) indicative of the respective front right, front left, rear right and rear left wheels, where it should be clarified which one of the four wheels the referred brake cylinder, hydraulic brake or electromagnetic valve corresponds to. However, each of the elements will be referred without such reference signs, where the above-described clarification is not required, or where it is referred to as a representative of those provided for the four wheels.

The brake system includes electric friction brakes (hereinafter abbreviated to as electric brakes) 40RL, 40RR provided for the respective rear left and right wheels 4RL, 4RR and hydraulic friction brakes (hereinafter abbreviated to as hydraulic brakes) 44FL, 44FR provided for the respective front left and right wheels 42FL, 42FR.

[Rear-Wheel Brake Line]

Figure 3:
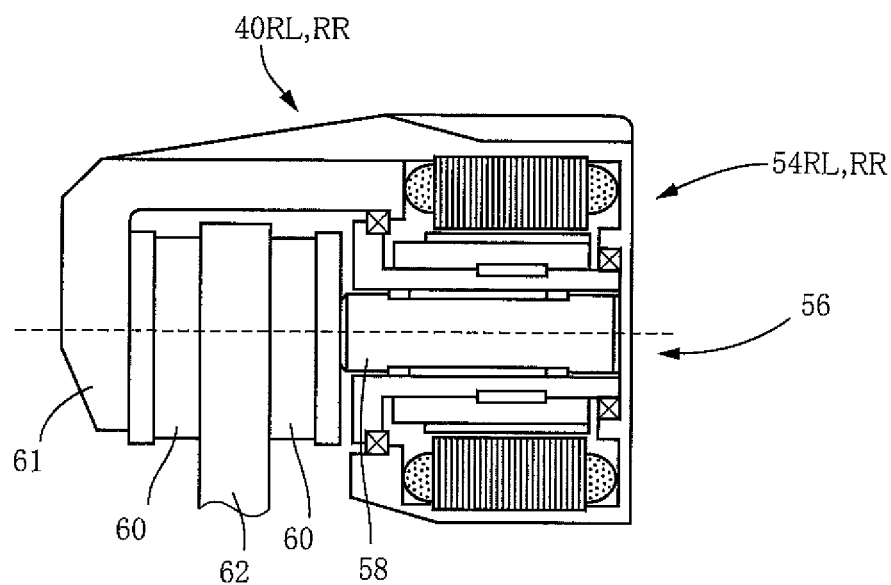
FIG. 3 is a cross sectional view of an electric brake included in the above-described brake system.

Each of the electric brakes 40RL, 40RR is a disk brake, as shown in FIG. 3, which is to be activated by a drive force of a corresponding one of electric motors (hereinafter referred to as brake motors). A rotary motion of the brake motor 54 is converted into a linear motion of a pressing rod 58 by a motion converting mechanism 56, and a frictional engagement member 60 is caused by a pressing device including the pressing rod 58 and a caliper 61, to be pressed against a brake rotary body 62 that is rotatable integrally with a corresponding one of the rear left and right wheels 4RL, 4RR, whereby rotation of the corresponding one of the rear left and right wheels 4RL, 4RR is restricted.

The brake motors 54RL, 54RR are connected to an electric brake motor ECU (hereinafter simply referred to as a brake motor ECU) 66 via respective drive circuits 64RL, 64RR (see FIG. 2). A pressing force sensor 68, which is connected to the brake motor ECU 66, is configured to detect an activation force of each of the electric brakes 40RL, 40RR (i.e., a pressing force applied to the frictional engagement member 60 by the brake motor 54, for example). The pressing force sensor 68 may be provided by either a sensor that is configured to detect an electric current flowing through each of the brake motors 54RL, 54RR or a sensor that is configured to detect directly a pressing force applied to the frictional engagement member 60 by the pressing rod 58. Each of the drive circuits 64RL, 64RR is capable of continuously controlling an amount of the electric current supplied to a corresponding one of the brake motors 54RL, 54RR, so as to be capable of continuously controlling a magnitude of the pressing force applied by the frictional engagement member 60 to the brake rotary body 62.

[Front-Wheel Brake Line]

Figure 4:
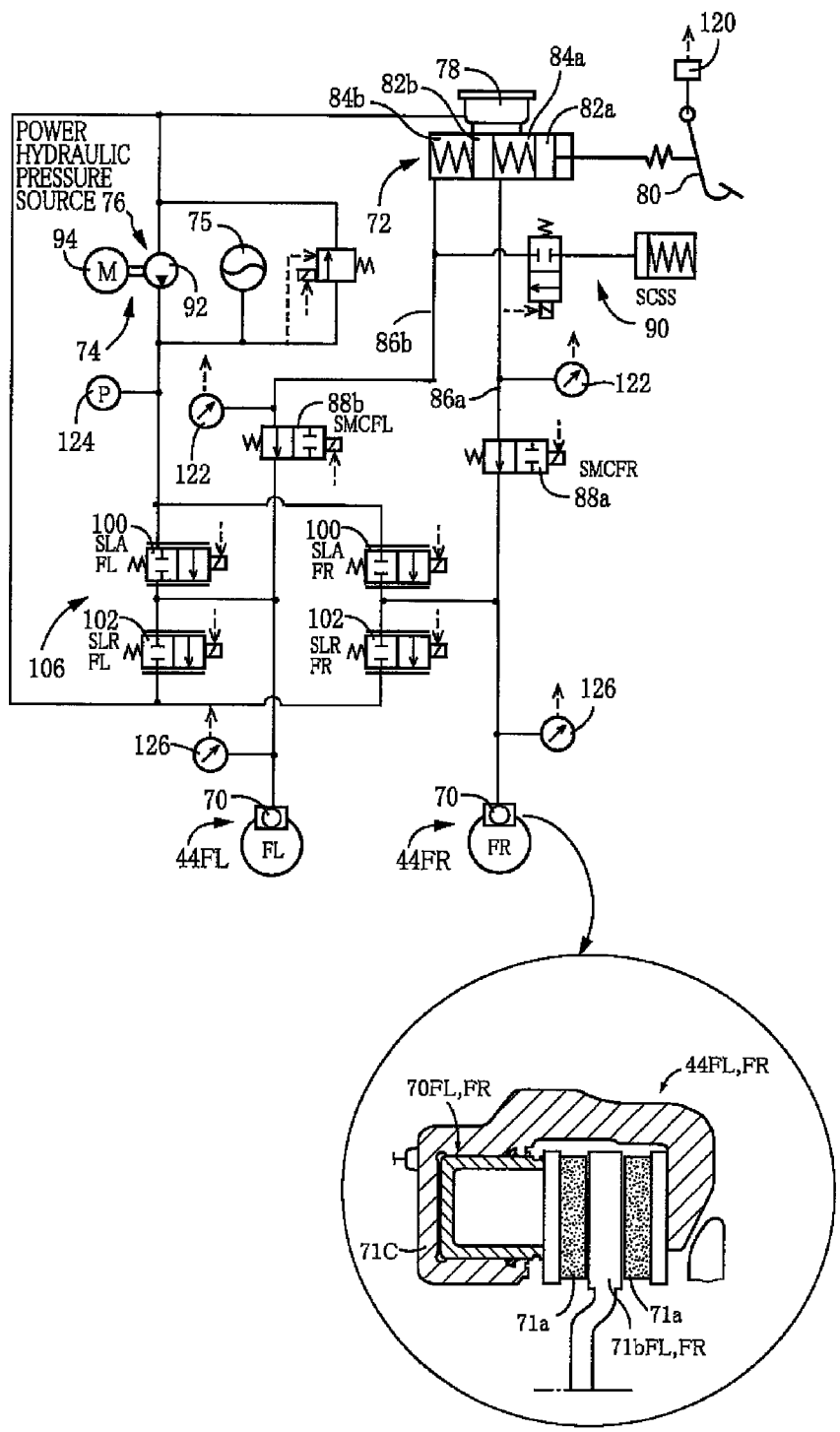
FIG. 4 is a circuit diagram including a hydraulic brake included in the above-described brake system.

Each of the hydraulic brakes 44FL, 44FR is a disk brake, as shown in FIG. 4, which is to be activated by a hydraulic force of a corresponding one of brake cylinders 70FL, 70FR. In each of the hydraulic brakes 44FL, 44FR, when a hydraulic pressure is supplied to a corresponding one of the brake cylinders 70FL, 70FR, a frictional engagement member 71a is caused by the hydraulic pressure of the corresponding one of the brake cylinders 70FL, 70FR and the pressing device that includes the caliper 71c, to be pressed against a corresponding one of brake rotary bodies 71bFL, 71bFR that is rotatable together with a corresponding one of the front left and right wheels 42FL, 42FR. Thus, rotation of the corresponding one of the front left and right wheels 42FL, 42FR is restricted.

To the brake cylinders 70FL, 70FR, there are connected a master cylinder 72 as a manual hydraulic pressure source, a power hydraulic pressure source 76 including a pump device 74 and an accumulator 75, and a reservoir 78 as a low pressure source.

The master cylinder 72 includes two pressurizing pistons 82a, 82b that are linked to a brake pedal 80 as a brake operating member. The master cylinder 72 has two pressurizing chambers 84a, 84b each of which is located on a front side of a corresponding one of the pressurizing pistons 82a, 82b. The pressurizing chambers 84a, 84b are connected to the respective brake cylinders 70FL, 70FR via respective fluid passages 86a, 86b. The fluid passages 86a, 86b are provided with respective normally-open electromagnetic on-off valves 88a, 88b, each of which is to be placed in an open state when an electric current is not being supplied to a solenoid thereof. The fluid passage 86b is provided with a stroke simulator 90.

In the power hydraulic pressure source 76, the pump device 74 includes a pump 92 and an electric pump motor (hereinafter simply abbreviated to as a pump motor) 94 that is configured to drive the pump 92. The pump device 74 is configured to pump a working fluid stored in the reservoir 78, pressurize the pumped working fluid, and supply the pressurized working fluid to the accumulator 75.

A pressure-increasing linear valve 100FL is provided between the power hydraulic pressure source 76 and the brake cylinder 70FL, while a pressure-increasing linear valve 100FR is provided between the power hydraulic pressure source 76 and the brake cylinder 70FR. A pressure-reducing linear valve 102FL is provided between the brake cylinder 70FL and the reservoir 78, while a pressure-reducing linear valve 102FR is provided between the brake cylinder 70FR and the reservoir 78.

The pressure-increasing linear valves 100FL, 100FR and pressure-reducing linear valves 102FL, 102FR are normally-closed valves each of which is to be placed in a closed state when an electric current is not being supplied to a corresponding one of pressure-increasing linear-valve solenoids (hereinafter abbreviated to as solenoids) 103FL, 103FR and pressure-reducing linear-valve solenoids (hereinafter abbreviated to as solenoids) 104FL, 104FR. By continuously controlling an amount of the electric current (electric power) supplied to each of the solenoids 103, 104, a magnitude of the hydraulic pressure of a corresponding one of the brake cylinders 70FL, 70FR is continuously controlled. It is possible to control a pressure difference between opposite sides of the pressure-increasing linear valves 100 such that the pressure difference is made smaller when the amount of the electric current supplied to the solenoid 103 is large than when the amount of the electric current supplied to the solenoid 103 is small. While the hydraulic pressure of the accumulator 75 is constant, the hydraulic pressure of each brake cylinder 70 is controlled to a higher value when the amount of the electric current supplied to the solenoid 103 is large than when the amount of the electric current supplied to the solenoid 103 is small.

In the present embodiment, a brake-pressure controlling actuator 106 is constituted by the pressure-increasing linear valve 100, pressure-reducing linear valve 102 and other elements, and is controlled based on command supplied from the brake ECU 110.

To the brake ECU 110, there are connected a brake switch 118 configured to detect whether or not the brake pedal 80 is in an operated state, a stroke sensor 120 configured to detect an operating stroke of the brake pedal 80, a manual pressure sensor 122 configured to detect the hydraulic pressure of the master cylinder 72, an accumulator pressure sensor 124 configured to detect the hydraulic pressure of the working fluid stored in the accumulator 75, and brake-cylinder pressure sensors 126FL, 126FR configured to detect the hydraulic pressures of the brake cylinders 70FL, 70FR. Further, the pump motor 94 is connected to the brake ECU 110 via a drive circuit 130. The solenoid 103 of the pressure-increasing linear valve 100 and the solenoid 104 of the pressure-reducing linear valve 102 are connected to the brake ECU 110 via drive circuits 132.

The manual pressure sensor 122 is configured to detect the hydraulic pressures of the pressurizing chambers 86*a*, 86*b* of the master cylinder 72. In each of the pressurizing chambers 86*a*, 86*b* of the master cylinder 72, the hydraulic pressure corresponding to an operating force applied to the brake pedal 80 is generated. In this sense, the master cylinder pressure may be referred to as a manual pressure.

The drive circuit 130, which is connected to the pump motor 94, includes a switch that is switchable between ON and OFF. In the present embodiment, the drive circuit 130 is not configured to continuously control the amount of the electric power supplied to the pump motor 94, so that the pump motor 94 is started and stopped by the switch.

The drive circuits 132 (that are provided for the respective linear valves 100, 102) are connected to the respective solenoids 103, 104 of the linear valves 100, 102. Each of the drive circuits 132 is capable of continuously controlling the electric power (electric current amount) supplied to a corresponding one of the solenoids 103, 104, so that the hydraulic pressure of each brake cylinder 70 is controlled to a magnitude corresponding to the electric power supplied to the solenoids 103, 104.

The above-described engine ECU 18, driving motor ECU 28, brake motor ECU 66 and brake ECU 110 and a hybrid ECU 140, each of which is constituted mainly by a computer, are connected to one another so as to be mutually communicable. To each of the ECUs 18, 28, 66, 110, 140, information is supplied as needed. To the hybrid ECU 140, there is connected an auxiliary-battery monitoring unit 142 that is configured to monitor a state of an auxiliary battery that will be described below.

[Power Line]

An alternating current is generated in the driving motor 20 and the motor generator 24, and is converted by the inverter 26 into a direct current. Then, an electric voltage of the direct current is changed by a converter (not shown) into a desired level, and the electric energy, i.e., the electric current having the desired level of electric voltage is returned to the main battery 22.

Further, an auxiliary battery 160 is connected to the main battery 22 via a converter 158. The electric voltage of the main battery 22 is lowered by the converter 158, and is stored in the auxiliary battery 160. Power consuming devices such as the plurality of ECUs and actuators are connected to the auxiliary battery 160, so that each of the power consuming devices can be activated by the electric power supplied thereto from the auxiliary battery 160. To the auxiliary battery 160, there are connected at least the above-described engine ECU 18, driving motor ECU 28, brake ECU 110, brake motor ECU 66, hybrid ECU 140, pump motor 94, solenoids 103, 104 (of the pressure-increasing and pressure-reducing linear valves 100, 102) and brake motors 54RL, 54RR. Further, to the auxiliary battery 160, there are connected at least an air-conditioner ECU 162, a suspension ECU (not shown) and drive circuits of suspension actuators (not shown).

In the present embodiment, a power source device 170 is constituted by at least the above-described main battery 22, auxiliary battery 160, inverter 26 and converter 158. Further, at least the ECUs 18, 28, 66, 110, 140, 162, motors 54, 94 and solenoids 103, 104, which are connected to the power source device 170, correspond to the power consuming devices.

At least the motors 54, 94 and the solenoids 103 are to be activated by the electric power supplied thereto from the power source device 170. The electric power is not supplied to at least the motors 54, 94 and the solenoids 103 from any other power source device that is other than the power source device 170.

In the present embodiment, each of the front left and right wheels 42FL, 42FR corresponds to a first wheel, the pump motor 94 corresponds to a first actuator, and the brake-pressure controlling actuator 106 corresponds to a first-braking-force controlling actuator. Further, each of the hydraulic brakes 44FL, 44FR corresponds to a first brake. A first brake device is constituted by at least the hydraulic brakes 44FL, 44FR, pressing devices (brake cylinders 70, calipers 71, etc), power hydraulic pressure source 76, pressure-increasing linear valves 100 and pressure-reducing linear valves 102. Each of the hydraulic brakes 44FL, 44FR includes the brake rotary body 71*b* rotatable integrally with a corresponding one of the front left and right wheels 42FL, 42FR, and the frictional engagement member 71*a* opposed to the brake rotary body 71*b*. The first brake device is a front-wheel-side hydraulic-brake device.

Meanwhile, each of the rear left and right wheels 4RL, 4RR corresponds to a second wheel, the brake motor 54 corresponds to a second actuator, and each of the electric brakes 40RL, 40RR corresponds to a second brake. A second brake device is constituted by at least the electric brakes 40RL, 40RR and pressing devices (brake motors 54, motion converting mechanisms 56). Each of the electric brakes 40RL, 40RR includes the frictional engagement member 60 and the brake rotary body 62. The second brake device is a rear-wheel-side electric-friction brake device.

Further, an actuator control device is constituted by at least the auxiliary-battery monitoring unit 142, hybrid ECU 140, brake ECU 110, brake-motor ECU 66 and drive circuits 64, 130, 132.

It is noted that each of the first and second brakes may be either a disk brake or a drum brake. The drive devices, drive power transmission mechanism, power source device, first brake device and second brake device may have constructions that are not limited to the details of the present embodiment.

<Controls Executed in Brake System>

In the brake system constructed as described above, a regenerative cooperative control is executed upon a depressing operation of the brake pedal 80.

A required total braking force required by a vehicle driver is obtained based on values detected by the stroke sensor 120 and the manual pressure sensor 122. Then, at least one of the regenerative brake device 6, brake motor 54, pressure-increasing linear valve 100 and pressure-reducing linear valve 102 is controlled such that a total braking force becomes close to the required total braking force. The total braking force includes at least one of a regenerative braking force applied to the rear left and right wheels 4RL, 4RR, a hydraulic friction braking force (hereinafter abbreviated to as a hydraulic braking force) generated by the hydraulic brakes 44FL, 44FR and applied to the front left and right wheels 42FL, 42FR, and an electric friction braking force generated by electric brakes 40RL, 40RR and applied to the rear left and right wheels 4RL, 4RR.

Hereinafter, the present embodiment will be described with an assumption that the braking force and a brake activation force (i.e., pressing force in the friction brake) have one-to-one correspondence with each other. That is, the term "braking force" and the term "brake activation force" will be used as the same meaning where appropriate with an assumption that an influence of a friction coefficient of a road surface is constant.

Further, a control, which is to be executed when the required total braking force is satisfied by at least one of the regenerative braking force and the friction braking force (that includes at least one of the hydraulic braking force and the electric friction braking force), such that a required friction braking force is satisfied by at least one of the hydraulic braking force and the electric friction braking force, will be referred to as a hydraulic/electric cooperative control where appropriate. The hydraulic/electric cooperative control is a part of the regenerative cooperative control.

Moreover, the hydraulic/electric cooperative control includes a control that is to be executed based on a regenerative electric energy (regenerative electric power) in the power source device 170. The control executed when the regenerative electric power is large, is a normal control. The executed when the regenerative electric power is small, is a saving-energy type control.

[Outline of Regenerative Cooperative Control]

The regenerative cooperative control will be described with reference to FIG. 5.

When the brake switch 118 is ON at a point $t_0$ of time, the operating stroke of the brake pedal 80 and the operating force applied to the brake pedal 80 are detected by the stroke sensor 120 and the manual pressure sensor 122, respectively. Based on the values detected by the sensors 120, 122, the required total braking force Fsref is obtained, and the required regenerative braking force Fmref is obtained. Then, the inverter 26 is controlled by the driving motor ECU 28 such that an actual regenerative braking force Fm* becomes close to the required regenerative braking force Fmref. In the present embodiment, for avoiding the braking force applied to each rear wheel, the required regenerative braking force Fmref is restricted because the regenerative braking force Fm is applied to the rear left and right wheels 4RL, 4RR.

When the actual regenerative braking force Fm* becomes smaller than the required total braking force Fsref at a point $t_1$ of time, a command requesting activations of the friction brakes (including the hydraulic brakes 44 and the electric brakes 40) is outputted. The required friction braking force Faref is determined based on a value (Fsref−Fm*) that is obtained by subtracting the actual regenerative braking force Fm* from the required total braking force Fsref. When the required friction braking force Faref becomes larger than 0, the required hydraulic braking force Fpref is increased and the hydraulic brakes 44FL, 44FR provided for the front wheels 42FL, 42FR, are activated, whereby the actual hydraulic braking force Fp* is increased. Thus, the drive circuits 132 are controlled by the brake ECU 110, for controlling the electric current supplied to the solenoids 103, such that the actual brake cylinder pressure P* detected by the brake-cylinder pressure sensor 126 becomes close to the required hydraulic pressure Pref corresponding to the required hydraulic braking force Fpref. The electric power is consumed in each solenoid 103.

When the actual hydraulic braking force Fp* reaches a given hydraulic braking force Fpth at a point $t_2$ of time, a command requesting activations of the electric brakes 40RL, 40RR provided for the rear wheels 4RL, 4RR is outputted. When the required electric friction braking force Feref becomes larger than 0, the brake motors 54 are activated, so that both of the regenerative braking force Fm and the electric friction braking force Fe are applied to the rear wheels 4RL, 4RR. The required electric braking force Feref is determined in accordance with a function h {Feref=h(Faref)}, while the required hydraulic braking force Fpref is determined based on a value (Faref−Fe*) that is obtained by subtracting the actual electric braking force Fe* from the required friction braking force Faref.

Each drive circuit 64 and each brake motor 54 are controlled by the brake motor ECU 66 such that the actual pressing force Fb*, which is obtained based on a value detected by the pressing force sensor 68, becomes close to the required pressing force Fbref that corresponds to the required electric friction braking force Feref. The electric power is consumed in each brake motor 54.

Further, the electric current supplied to each solenoid 103 is controlled by the brake ECU 110 such that the actual brake cylinder pressure P* becomes close to the required hydraulic pressure Pref.

For example, the required hydraulic braking force Fpref and the required electric braking force Feref may be determined, such that the hydraulic braking force Fp applied to the front wheels 42FL, 42FR and the electric friction braking force Fe applied to the rear wheels 4RL, 4RR have magnitudes that are determined in accordance with an ideal braking-force front/rear distribution. However, it is not essential that the required hydraulic braking force Fpref and the required electric braking force Feref are determined in such a manner.

Figure 5:
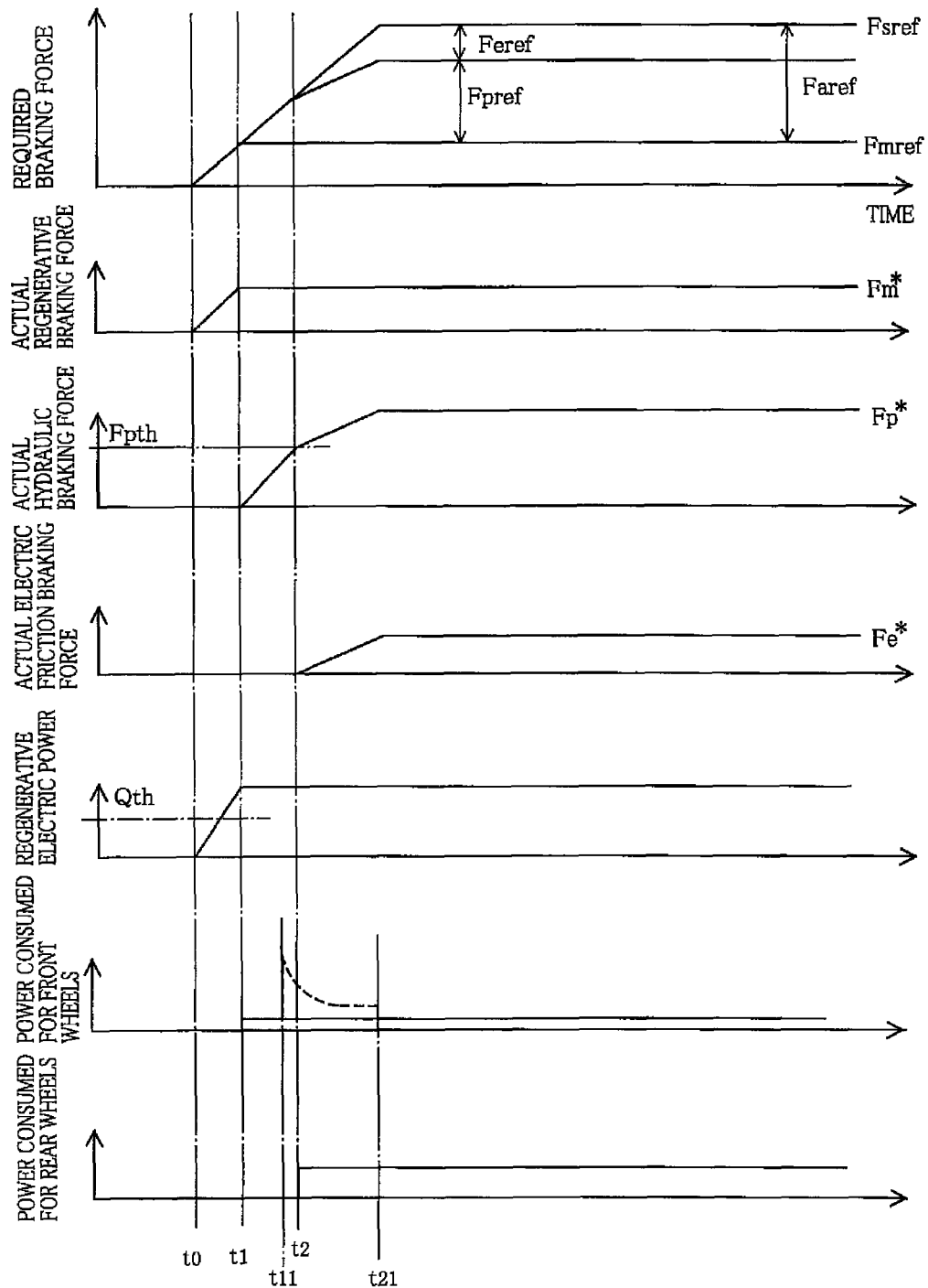
FIG. 5 is a view showing changes of braking forces and power consumption in case of execution of a regenerative cooperative control (including a normal control) in the above-described brake system.

In FIG. 5, the power consumed by the solenoids 103 (the power supplied to the solenoids 103) and the power consumed by the brake motors 54 are described as if they were constant in amount, although they are actually not necessarily constant. Where the change of the power consumption is not required to be described in detail in relation with the present invention, the description thereof will not be provided. However, where the change of the power consumption is required to be described in relation with the present invention, the description thereof will be provided as needed.

Each of the required total braking force, required hydraulic braking force, required electric friction braking force, actual regenerative braking force, actual hydraulic braking force and actual electric friction braking force is calculated or obtained in a corresponding one of the plurality of ECUs such as the ECUs 140, 110, 28, 66, and is transmitted to other ECU. Further, a control command is prepared in one of the plurality of ECUs 140, 110, 28, 66, and is outputted from the one of the plurality of ECUs 140, 110, 28, 66. Since information is transmitted among the these ECUs, the calculation, obtention and control command output may be done in any one of the ECUs. In the description of the present embodiment, the description of the information transmission among the ECUs is not provided.

Figure 6:
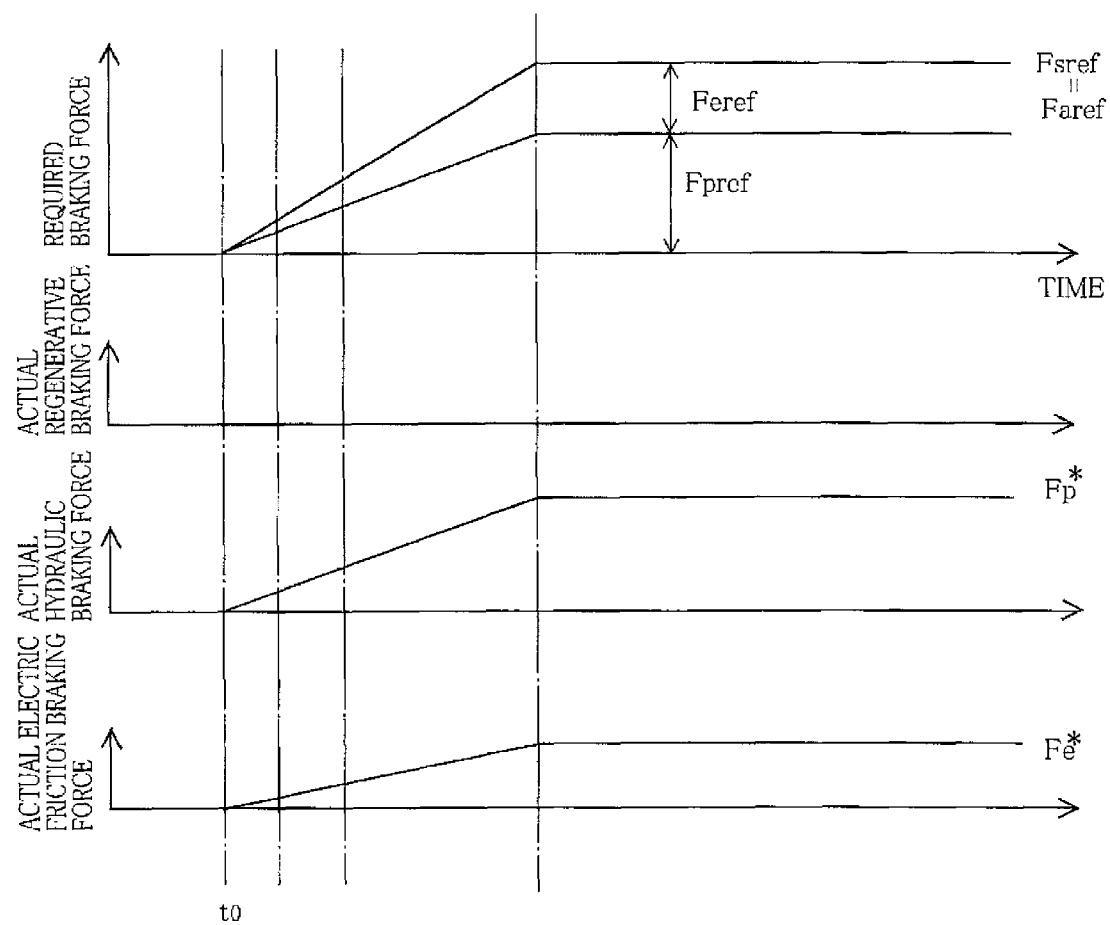
FIG. 6 is a view showing changes of braking forces in another case of execution of the regenerative cooperative control (including the normal control) in the above-described brake system.

FIG. 6 shows an example of the control in a case where the regenerative braking force is 0. Since the electric energy is not returned from the driving motor 20 to the main battery 22, the required regenerative braking force Fmref becomes 0. When the brake switch 118 is ON at a point $t_0$ of time, the required friction braking force Faref is equalized to the required total braking force Fsref (Faref=Fsref). Thus, the required hydraulic braking force Fpref and the required electric friction braking force Feref are increased, and the front-wheel braking force (hydraulic braking force Fp) and the rear-wheel braking force (electric friction braking force Fe) are controlled.

[Control of Pump Motor]

The hydraulic pressures of the brake cylinders 70FL, 70FR are controlled by utilizing the hydraulic pressure of the accumulator 75, as described above. The pump motor 94 is started and stopped such that the hydraulic pressure of the accumulator 75 is kept within a given range. The pump motor 94 is controlled by execution of a pump-motor control program that is represented by a flow chart of FIG. 9. The pump-motor control program is executed at a predetermined time interval.

The execution of this pump-motor control program is initiated with step 1 (hereinafter abbreviated to as "S1" as well as the other steps) that is implemented to detect an accumulator pressure Pacc by the accumulator pressure sensor 124. In S2, it is judged whether the pump motor 94 is being activated or not, namely, whether the switch (drive circuit) 130 is in its ON state or not. When the pump motor 94 in its non-activated state and the switch 130 is in its OFF state, S3 is implemented to judge whether or not the accumulator pressure Pacc is lower than a lower limit value PL of the given range. When the accumulator pressure Pacc is not lower than the lower limit value PL (Pacc≥PL), the pump motor 94 is held in its non-activated state. When the accumulator pressure Pacc is lower than the lower limit value PL (Pacc<PL), S4 is implemented to place the switch 130 into its ON state.

Since the pump motor 94 is in its activated state in the next execution of this pump-motor control program is executed, a positive judgment (YES) is obtained in S2 whereby S5 is implemented to judge whether or not the accumulator pressure Pacc is higher than an upper limit value PH of the given range. When the accumulator pressure Pacc is not higher than the upper limit value PH (Pacc≤PH), the switch 130 is held in its ON state whereby the activation of the pump motor 94 is maintained. When the accumulator pressure Pacc becomes higher than the upper limit value PH (Pacc>PH), S5 is implemented to place the switch 130 into its OFF state whereby the pump motor 94 is stopped.

The pump motor 94 is started when the start condition is satisfied (namely, when the accumulator pressure becomes lower than the lower limit value PL), and is stopped when the termination condition is satisfied (namely, when the accumulator pressure becomes higher than the upper limit value PH).

The accumulator pressure is reduced as the hydraulic pressure is supplied to each brake cylinders 70.

In the case shown in FIG. 5, for example, the supply of the hydraulic pressure from the accumulator 75 to each brake cylinder 70 is started at a point $t_1$ of time. Then, when the accumulator pressure Pacc becomes lower than the lower limit value PL (the start condition is satisfied) at a point $t_{11}$ of time, the pump motor 94 is started. Then, when the accumulator pressure becomes higher than the upper limit value PH whereby the termination condition is satisfied at a point $t_{21}$ of time, the pump motor 94 is stopped. When the pump motor 94 is started as the switch 130 is placed from its OFF state to ON state, an inrush current is caused to flow whereby the power consumed by the pump motor 94 is momentarily increased as indicated by broken line.

There is a risk that the electric voltage of the auxiliary battery 160 is reduced if a total power consumption (that includes individual power consumptions by the plurality of power consuming devices activatable by supply of the electric power from the auxiliary battery 160) is excessively increased. For example, when the inrush current flows through the pump motor 94, if a large amount of the electric power is consumed by the other actuator, the total power consumption is excessively increased thereby causing a risk of the voltage drop.

However, even where the total power consumption is not changed, the electric voltage of the auxiliary battery 160 is less likely to be reduced when the regenerative electric power returned to the auxiliary battery 160 is large than when the regenerative electric power returned to the auxiliary battery 160 is small. In general, when the regenerative electric power and the total power consumption are coincident with each other, the reduction of the power reserve amount, which is the electric power stored in the auxiliary battery 160, is restrained, whereby the power reserve amount can be maintained stably.

In the present embodiment, for maintaining balance between generation and consumption of the electric energy in the auxiliary battery 160, at least one of the plurality of power consuming devices is controlled in such a manner that avoids the total power consumption from being excessively made large relative to the regenerative electric power returned to the auxiliary battery 160. Specifically described, when the regenerative electric power Q returned to the auxiliary battery 160 is not smaller than a given electric power Qth (Q≥Qth), the normal control is executed irrespective of the operational state of the pump motor 94. When the regenerative electric power Q is smaller than the given electric power Qth (Q<Qth) and the pump motor 96 is in its activated state, the saving-energy type control is executed so that the electric power supplied to each brake motor 54 is reduced.

Further, in controls of the power consuming devices, it is possible to take account of the electric voltage of the auxiliary battery 160. The voltage drop in the auxiliary battery 160 can be retrained more satisfactorily, by controlling the power consuming devices on the basis of both of the electric voltage of the auxiliary battery 160 and the regenerative electric power returned to the auxiliary battery 160.

The regenerative electric power returned to the auxiliary battery 160 is made larger when the regenerative braking force is large than when the regenerative braking force is small. The regenerative electric power can be obtained based on, for example, control states of the inverter 26 and converter 158 and the electric current flowing to an input side of the auxiliary battery 160. The electric power returned to the auxiliary battery 160 is obtained by the auxiliary-battery monitoring unit 142.

Further, there is also a case when the electric power is supplied to the auxiliary battery 160 from the motor generator 24. In the present embodiment, brake actuators such as the brake motors 54 and pressure-increasing linear valves 100 are controlled based on the regenerative electric power returned from the regenerative brake device 6, for thereby maintaining balance between the obtained energy and the consumed energy in the entirety of a brake apparatus for braking the vehicle.

[Outline of Saving-Energy Type Control]

In the present embodiment, the pump motor 94 is activated with a higher priority being given to the pump motor 94 rather than to the brake motors 54. Thus, the power consumed by each brake motors 54 is reduced without reduction of the power consumed by the pump motor 94.

It is undesirable that the accumulator pressure becomes insufficient (i.e., becomes lower the lower limit value), because the insufficiency of the accumulator pressure leads to reduction of responsiveness of each hydraulic brake 44 and makes it impossible to sufficiently increase an activation force of each hydraulic brake 44. Further, since each front wheel 42 is capable of generating a larger braking force acting on the vehicle because of movement of a load upon braking of the vehicle, the reduction of the brake activation force (corresponding to the brake cylinder pressure) of the each of front left and right wheels 42FL, 42FR leads to a problematic reduction of the braking force acting on the vehicle. Moreover, also from a point of view of ideal braking-force front/rear distribution, it is preferable that the braking force of each front wheel 42 is larger than the braking force of each rear wheel 4. On the other hand, even if the braking force of each of the rear left and right wheels 4RL, 4RR is reduced, this reduction does not cause reduction of the running stability of the vehicle.

In view of the above, a higher priority is given to the activation of the pump motor 94 rather than to the activation of each brake motor 54. In a case when the total power consumption from the auxiliary battery 160 is required to be reduced, namely, in a case when the saving-energy type control is executed, the power consumed by each brake motor 54 is reduced so that the brake activation force (pressing force) of each rear wheel 4 is reduced and the electric friction braking force is reduced. In the present embodiment, (A) start of each brake motor 54 is delayed, and (B) output of each brake motor 54 is reduced during its activation.

The reduction of the electric friction braking force Fe could result in an insufficiency for the required friction braking force Faref. However, this insufficiency can be compensated by increase of the hydraulic braking force Fp applied to the front left and right wheels 42FL, 42FR. The increase of the hydraulic braking force Fp can be made by increasing the electric current supplied to the solenoid 103 of each of the pressure-increasing linear valves 100.

When the electric current supplied to the solenoid 103 of each pressure-increasing linear valve 100 is increased by a given amount $\Delta Ef$, the hydraulic braking force Fp (that corresponds to an increase of the hydraulic pressure of the brake cylinder provided for each of the front wheels 40FL, 40FR) is increased by a certain magnitude $\Delta Fp$. This increased magnitude $\Delta Fp$ of the hydraulic braking force Fp is larger than an increased magnitude $\Delta Fe$ of the electric friction braking force Fe (that corresponds to an increase of the pressing force), which is caused when the electric current supplied to each of the brake motors 54RL, 54RR is increased by a given amount $\Delta Ef (=\Delta Ef)$. Therefore, when a sum of the hydraulic braking force Fp applied to the front wheels 40FL, 40FR and the electric friction braking force Fe applied to the rear wheels 4RL, 4RR is unchanged, the total power consumption can be reduced by increasing the hydraulic braking force Fp and reducing the electric friction braking force Fe.

[Hydraulic/Electric Cooperative Control]

Figure 10:
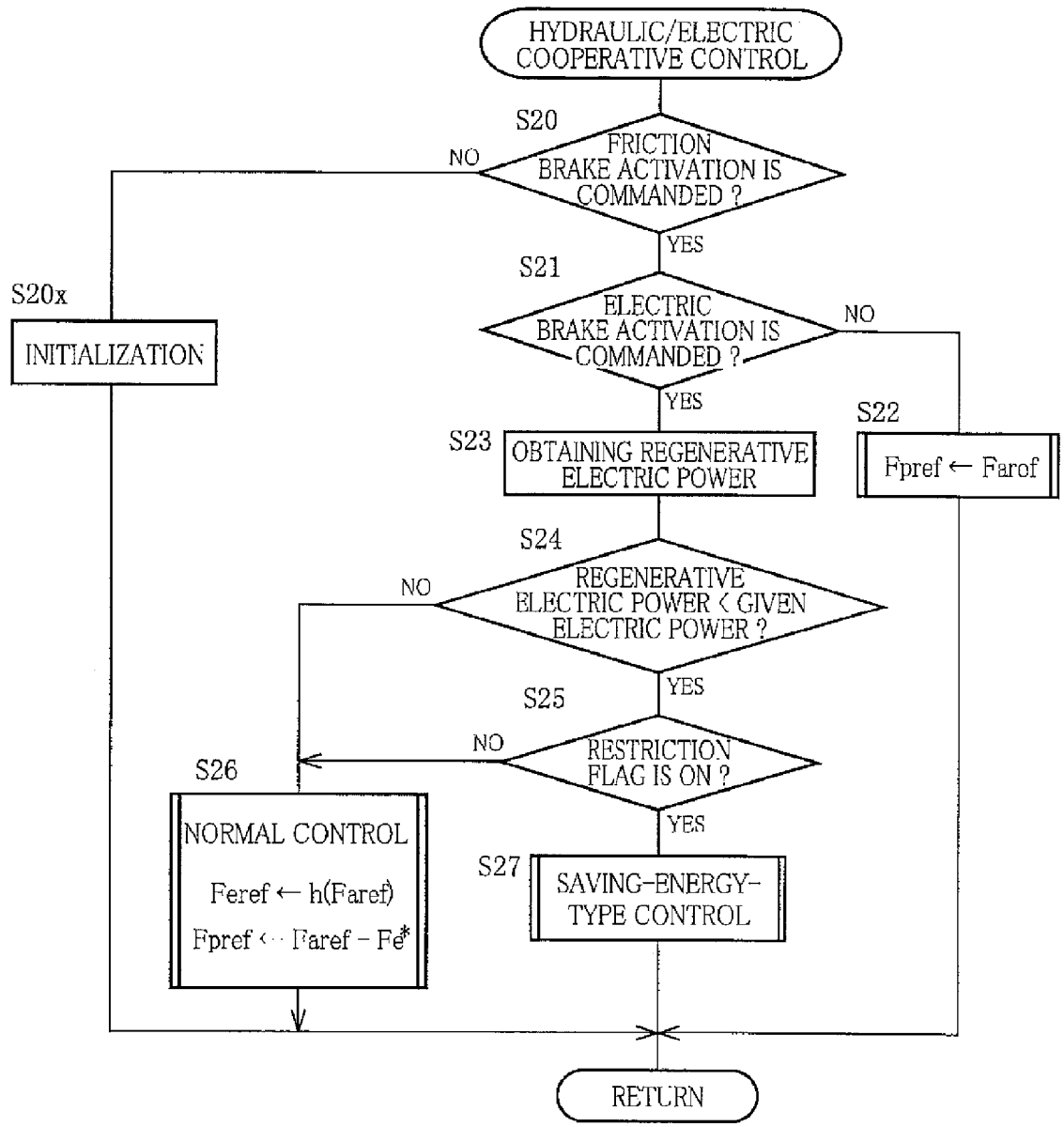
FIG. 10 is a flow chart representing a hydraulic/electric cooperative control program that is stored in the storage portion of the brake ECU of the above-described brake system.

The hydraulic/electric cooperative control is executed by carrying out a hydraulic/electric cooperative control program that is represented by flow chart of FIG. 10. The hydraulic/electric cooperative control program is executed at a predetermined time interval.

In S20, it is judged whether the required friction braking force Faref is larger than 0 (Fare f>0), namely, whether there is a command requesting activations of the friction brakes 40, 44. When there is not a command requesting activations of the friction brakes 40, 44, S20x is implemented to initialize parameters, flags and the like that are used in the execution of this control program. When there is a command requesting activations of the friction brakes 40, 44, S21 is implemented to judge whether there is a command requesting activations of the electric brakes 40RL, 40RR (Feref>0). When there is not a command requesting activations of the electric brakes 40RL, 40RR, the required friction braking force Faref is satisfied by the hydraulic braking force Fp. In the present embodiment, it is judged whether the actual hydraulic braking force Fp* is not larger than the given hydraulic braking force Fpth. When the hydraulic braking force Fp* is not larger than the given hydraulic braking force Fpth, it is regarded that the activations of the electric brakes 40RL, 40RR are not required. In S22, the required hydraulic braking force Fpref is set to the required friction braking force Faref, so that the electric current supplied to the solenoid 103 of each pressure-increasing linear valve 100 is controlled such that the actual hydraulic pressure P* becomes close to the target hydraulic pressure Pref that corresponds to the required hydraulic braking force Fpref.

$$Fpref \leftarrow Faref$$

On the other hand, when the hydraulic braking force Fp* is larger than the given hydraulic braking force Fpth, a command requesting activations of the electric brakes 40RL, 40RR is issued.

A positive judgment (YES) is obtained in S21, and S23 is implemented to cause the auxiliary-battery monitoring unit 142 to obtain the regenerative electric power Q returned to the auxiliary battery 160. Then, in S24, it is judged whether the regenerative electric power Q is smaller than the given electric power Qth.

In S25, it is judged whether it is judged whether the restriction flag is ON or not. The restriction flag is a flag that is set to ON when the power consumed by the pump motor 94 is larger than a given power consumption.

The inrush current, which has a peak, is rapidly reduced after having reached its maximum value, and then becomes almost a steady current. The restriction flag is held ON from start of the pump motor 94 until the inrush current becomes close to the steady current and the power consumption becomes not larger than the given power consumption. An approximated length of time (i.e., given time) from the start of the pump motor 94 until the power consumption becomes not larger than the given power consumption, is a known value.

Figure 11:
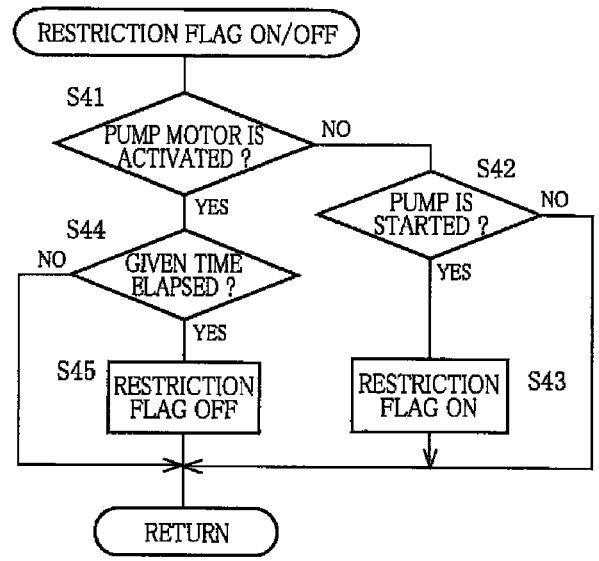
FIG. 11 is a flow chart representing a restriction-flag ON/OFF program that is stored in the storage portion of the brake ECU of the above-described brake system.

The restriction flag is set to one of ON and OFF, which is selected by execution of a restriction flag ON/OFF program that is represented by flow chart of FIG. 11.

This program is initiated with S41 in which it is judged whether the pump motor 94 is being activated or not. When the pump motor 94 is not being activated, S42 is implemented to judge whether the pump motor 94 has been started. When the pump motor 94 has been started, S43 is implemented to set the restriction flag to ON.

Further, while the pump motor 94 is being activated, it is judged whether a given time Tth has elapsed from the start of activation of the pump motor 94. When the given time Tth has elapsed, a positive judgment (YES) is obtained in S44 whereby S45 is implemented to set the restriction flag to OFF.

[Normal Control]

When a negative judgment (NO) is obtained in at least one of S24 and S25, namely, when the regenerative electric power is not smaller than the given electric power (Q≥Qth) or when the restriction flag is OFF, S26 is implemented to execute the normal control.

The required electric friction braking force Feref is obtained based on the required friction braking force Faref in accordance with a predetermined function h. Then, the required hydraulic braking force Fpref is determined based on a value that is obtained by subtracting the actual electric friction braking force Fe* from the required friction braking force Faref.

The brake motors 54 and the pressure-increasing linear valves 100 are controlled such that the required friction braking force Faref is satisfied by cooperation of the electric friction braking force Fe and the hydraulic braking force Fp.

$$Feref \leftarrow h(Faref)$$

$$Fpref \leftarrow Faref - Fe*$$

[Saving-Energy Type Control]

Figure 12:
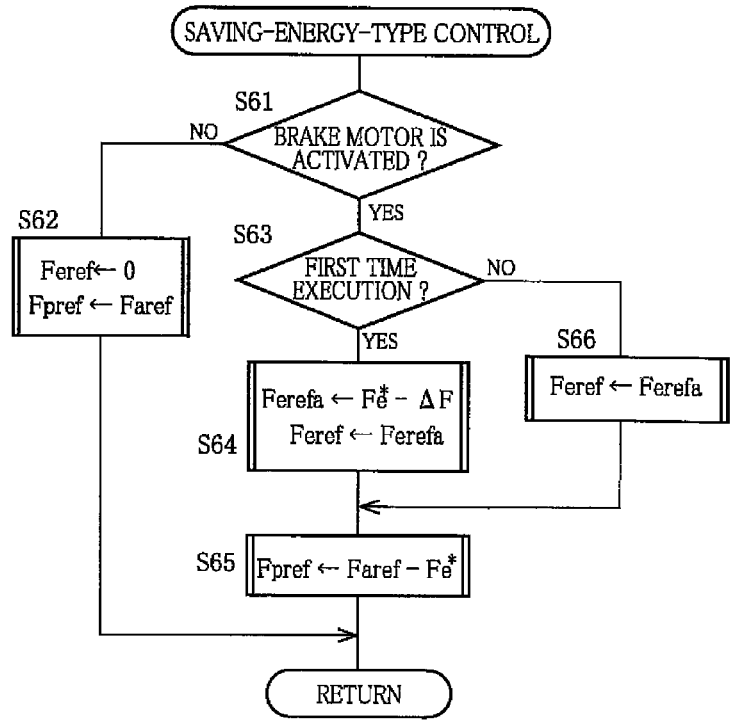
FIG. 12 is a flow chart representing a part (saving-energy type control) of the above-described hydraulic/electric cooperative control program.

When a positive judgment (YES) is obtained in both of S24 and S25 (when regenerative electric power Q is smaller than the given electric power Qth and the restriction flag is ON), the need to reduce the total power consumption is high, so that the saving-energy type control is executed in S27. The saving-energy type control routine is represented by flow chart of FIG. 12.

In S61, it is judged whether the electric brakes 40RL, 40RR are in the activated states, namely, whether the brake motors 54 are in the activated states. When they are in the stopped states, S62 is implemented. In S62, the required electric friction braking force Feref is set to 0 while the required hydraulic braking force Fpref is set to the required friction braking force Faref. The pressure-increasing linear valves 100 are controlled such that the actual hydraulic pressure P* becomes close to the required hydraulic pressure Pref corresponding to the required hydraulic braking force Fpref.

Upon request of activations of the electric brakes 40RL, 40RR, if the restriction flag is ON and the regenerative electric power Q is smaller than given electric power Qth, the activations of the electric brakes 40RL, 40RR are delayed. Thus, the brake motors 54, which had been scheduled to be started, are not started. If the regenerative electric power Q is not smaller than the given electric power Qth, the output of each brake motor 54 is made smaller and the power consumption is made smaller, as compared with a case when the pump motor 94 is in its non-activated state.

The resulting insufficiency for the required total braking force Fsref (required friction braking force Faref) is reduced by increase of the braking force of each of the hydraulic brakes 44FL, 44FR. The increase of the braking force of each hydraulic brake 44 is mad by increasing the amount of the electric current supplied to the solenoid 103 of each pressure-increasing linear valve 100.

Thus, the required electric friction braking force Feref is set to 0, and the required hydraulic braking force Fpref is increased for compensating the insufficiency, so that the electric current supplied to each pressure-increasing linear valve 100 is increased. However, the reduction of the power consumed by the brake motors 54 (i.e., the power consumption reduction owing to non-consumption of an amount of the electric power which had been scheduled) makes it possible to reduce the total power consumption including the electric power consumed individually by the brake motors 54, linear valves 100 and pump motor 94. The reduction of the power consumed by the brake motors 54 can be considered as a control that is executed such that the total power consumption is made not larger than the upper limit value that is determined depending on the regenerative electric power Q.

It is noted that, when a negative judgment (NO) is obtained in S25 with the restriction flag being OFF, S26 is implemented to execute the normal control. Thus, the brake motor 54 is allowed to be started.

On the other hand, when the restriction flag is switched from OFF to ON during the activated states of the electric brakes 40RL, 40RR, S63 is implemented to judge whether it is the first execution of this step. When a positive judgment (YES) is obtained in S61 for the first time, S64 is implemented. In S64, a value, which is obtained by subtracting a given value $\Delta F$ from the actual electric friction braking force Fe* (i.e., an actual value of the electric friction braking force at the point of time), is set to the required electric friction braking force Feref. In S65, the required hydraulic braking force Fpref is determined based on a value that is obtained by subtracting the actual electric friction braking force Fe* from the required friction braking force Faref.

$Ferefa \leftarrow Fe^* - \Delta F$ $Feref \leftarrow Ferefa$ $Fpref \leftarrow Faref - Fe^*$ The electric power supplied to each of the brake motors 54 is controlled such that the actual pressing force becomes close to the required pressing force that corresponds to the required electric friction braking force Feref. Meanwhile, the actual brake cylinder pressure P* is controlled to become close to the required hydraulic pressure Pref that corresponds to the required hydraulic braking force Fpref.

When the present program is executed next time, a negative judgment (NO) is obtained in S63 because the execution of the program is not for the first time, whereby S66 is implemented to set the required electric friction braking force Feref to a value Ferefa that is the same as in the previous execution.

The electric friction braking force Fe is set to a value that is smaller than the actual electric friction braking force Fe* (that is the actual value upon the first execution of S64 as a result of setting of the restriction flag to ON) by the given value $\Delta F$, and is held in this value as long as the restriction flag is ON.

Further, since the required hydraulic braking force Fpref is increased by a value corresponding to the reduction of the required electric friction braking force Feref, the electric current supplied to the solenoid 103 of each pressure-increasing linear valve 100 is increased.

Thereafter, when the restriction flag is switched to OFF, the normal control is executed again in S26.

Thus, when the restriction flag is set to ON during activation of each brake motor 54, the power consumed by each brake motor 54 is reduced. As long as the restriction flag is ON, the reduced power consumption is maintained.

The above-described given value $\Delta F$, by which the electric friction braking force Fe is reduced, may be a fixed value or a variable value. Since the power consumption in the pump motor 94 is substantially constant, it is possible to estimate, based on the given electric power Qth or the like, a value of the total power consumption which is unlikely to cause the voltage drop (i.e., a value corresponding to the upper limit value of the total power consumption which is determined depending on the regenerative electric power).

Therefore, it is possible to suitably determine the above-described given value $\Delta F$, on the basis of the upper limit value of the total power consumption which is determined depending on the regenerative electric power, the power consumed individually by the pump motor 94, and an average value (or a maximum value) of the power consumed by the brake motors 54.

Further, the above-described given value $\Delta F$ may be obtained or updated, as needed, based on, for example, an actual value of the regenerative electric power Q.

Specific examples of the controls will be described with reference to FIGS. 7 and 8.

(A) Delay of Start of Brake Motors 54

Figure 7:
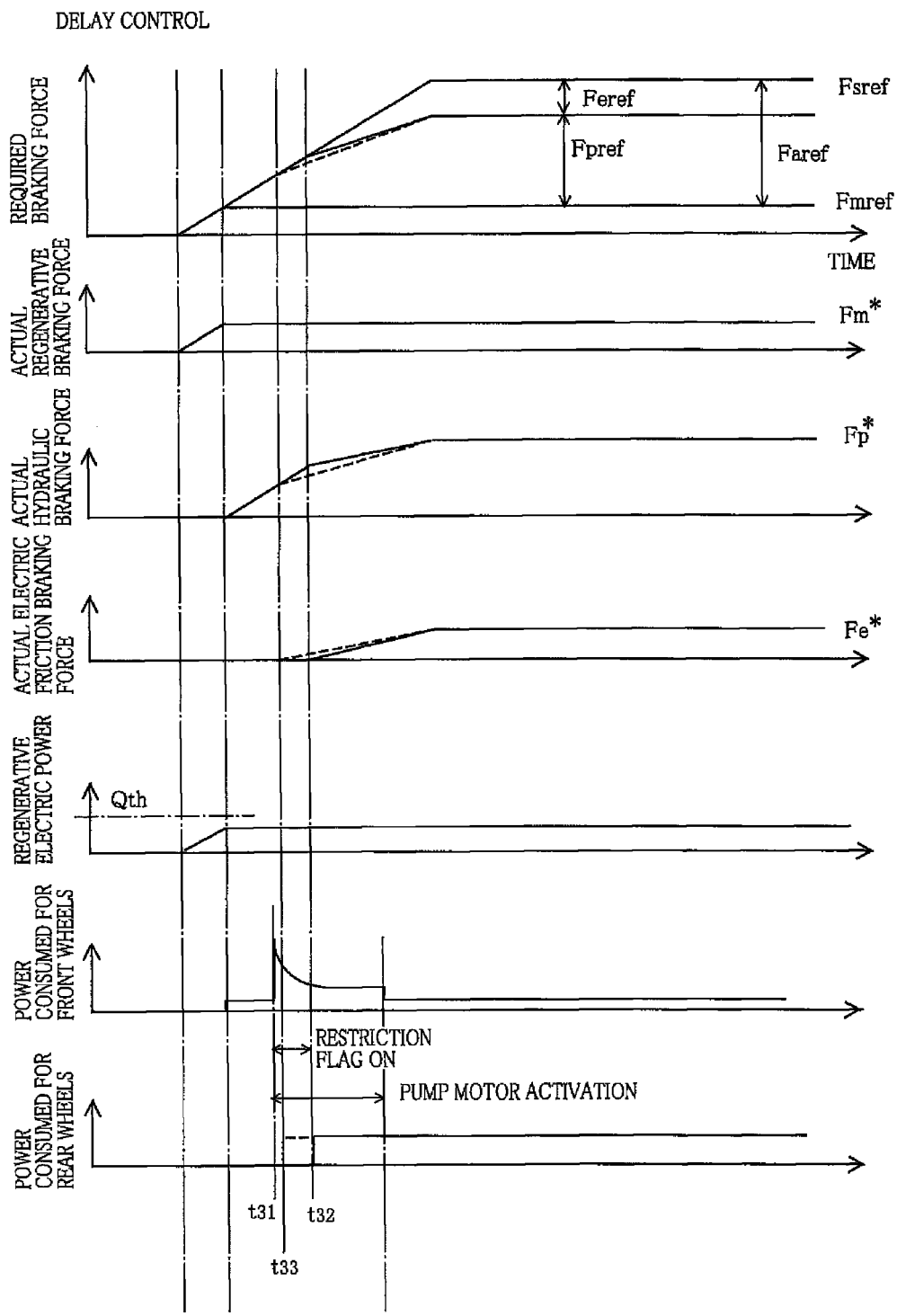
FIG. 7 is a view showing changes of braking forces and power consumption in case (start delay) of execution of the regenerative cooperative control (including a saving-energy type control) in the above-described brake system.

In FIG. 7, at a point $t_{31}$ of time, the drive circuit (switch) 130 is switched from OFF to ON whereby the restriction flag is set to ON. When a given time has elapsed from the point $t_{31}$ of time, the restriction flag is switched to OFF at a point $t_{32}$ of time. Although the start of activations of the electric brakes 40RL, 40RR is requested at a point $t_{33}$ of time, the start of each of the brake motors 54 is inhibited. The start of each brake motor 54 is allowed at the point $t_{32}$ of time.

Further, the required hydraulic braking force Fpref is increased for compensating the insufficiency for the required total braking force Fsref (required friction braking force Faref), wherein the insufficiency results from the delay of start of the electric brakes 40RL, 40RR. Thus, the required hydraulic braking force Fpref is increased so that the electric current supplied to the pressure-increasing linear valves 100 is increased. The actual hydraulic braking force Fp* is made larger in the saving-energy type control as indicated by solid line, than in the normal control as indicated by broken line.

(B) Reduction of Output of Brake Motors 54

Figure 8:
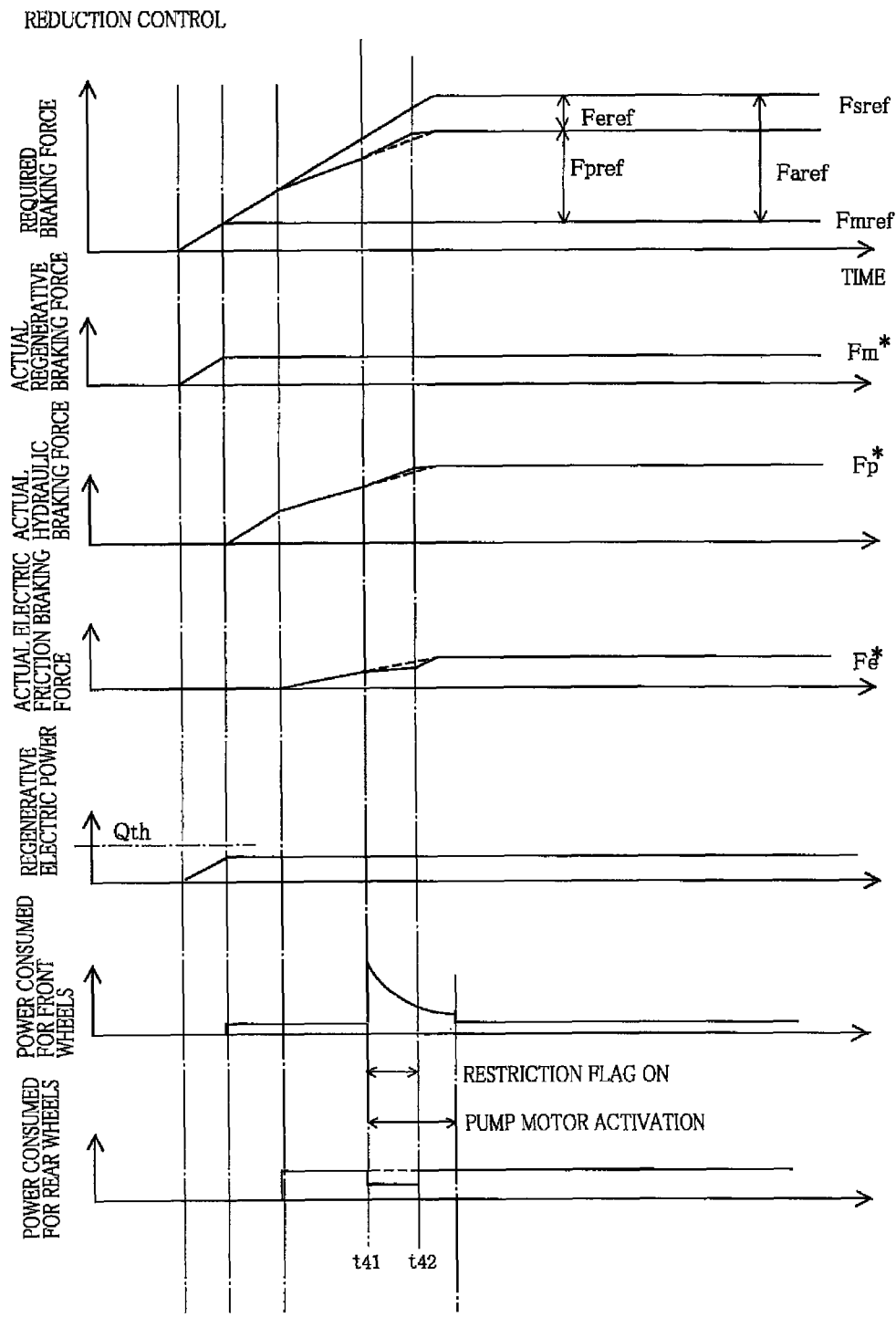
FIG. 8 is a view showing changes of braking forces and power consumption in case (output reduction) of execution of the regenerative cooperative control (including the saving-energy type control) in the above-described brake system.

In FIG. 8, during activations of the brake motors 54, the restriction flag is ON from a point $t_{41}$ of time at which the pump motor 94 is started, until a point $t_{42}$ of time at which a given time has elapsed from the start of the pump motor 94. The electric current supplied to each of the brake motors 54 is reduced while the electric current supplied to the solenoid 103 of each of the pressure-increasing linear valves 100 is increased. Consequently, as indicated by solid lines, the actual electric friction braking force Fe* is reduced while the actual hydraulic braking force Fp* is increased, so that the total power consumption is reduced while the required friction braking force Faref is satisfied.

As described above, in the present embodiment, the total power consumption in the brake system is controlled based on the regenerative electric power returned to the power source device 170, so that balance between generation and consumption of the electric power in the power source device 170 is maintained. It is therefore possible to prevent the voltage drop in the power source device 170 and to stably maintain the electric voltage of the power source device 170. Further, as compared as a case where the total power consumption is controlled based on the electric voltage of the power source device 170, it is possible to more effectively prevent the voltage drop of the power source device 170 at an earlier point of time.

Further, in the above description of the present embodiment, there have been separately described the case where the restriction flag is set to ON before activations of the brake motors 54 and the case where the restriction flag is set to ON during activations of the brake motors 54. However, there is also a case where the restriction flag is set to ON before and during the activations of the brake motors 54 in a single-time brake operation.

Further, in the present embodiment, since the brakes provided for the rear wheels 4 are the electric brakes 40, the piping or the like is not required, so that the instability can be improved.

Further, since the voltage drop in the auxiliary battery 160 is prevented, the accumulator 75 can be made compact in size. Where the capacity of the accumulator is large, frequency of the activation of the pump motor 94 is made low, thereby reducing probability of the activation of the pump motor 94 concurrently with the activations of the brake motors 54, and hardly causing the voltage drop. However, the large capacity of the accumulator 75 problematically leads to a large size of the accumulator 75 and a large size of the brake system.

On the other hand, if the accumulator 75 is constructed compact in size, frequency of the activation of the pump motor 94 is made high, thereby increasing probability of the activation of the pump motor 94 concurrently with the activations of the brake motors 54. Further, starting and stopping of the activation of the pump motor 94 are repeated, thereby causing a problem such as reduction of the service life of the pump motor 94.

However, in the brake system according to this Embodiment 1, the brake motors 54 are controlled in a manner that maintains the balance between generation and consumption of the electric energy in the auxiliary battery 160, so that it is possible to hardly cause the voltage drop in the auxiliary battery 160. Further, each of the pump motor 94 and a drive circuit (switch circuit) 130 improved the performance and prolonged the service life.

Thus, in the brake system according to Embodiment 1, it is possible to make the accumulator 75 be constructed compact in size.

In the present embodiment, a regenerative-braking-force-based obtaining portion is constituted by at least the auxiliary-battery monitoring unit 142 and portions of the actuator control device that are assigned to store and implement S23.

Further, a first-braking-force increasing portion is constituted by at least portions of the actuator control device that are assigned to store and implement S62 and S65. An activation-start delaying portion is constituted by at least portions of the actuator control device that are assigned to store and implement S61 and S62. A torque-limiter-type actuator controlling portion is constituted by at least portions of the actuator control device that are assigned to store and implement S61, S63, S64 and S65. The torque-limiter-type actuator controlling portion corresponds to an activation-state second-actuator power-consumption reducing portion, a first-actuator priority controlling portion, an upper-limit-value-based controlling portion, a saving-energy-type actuator controlling portion and a pump-motor-priority consumed-electric-energy reducing portion.

Figure 9:
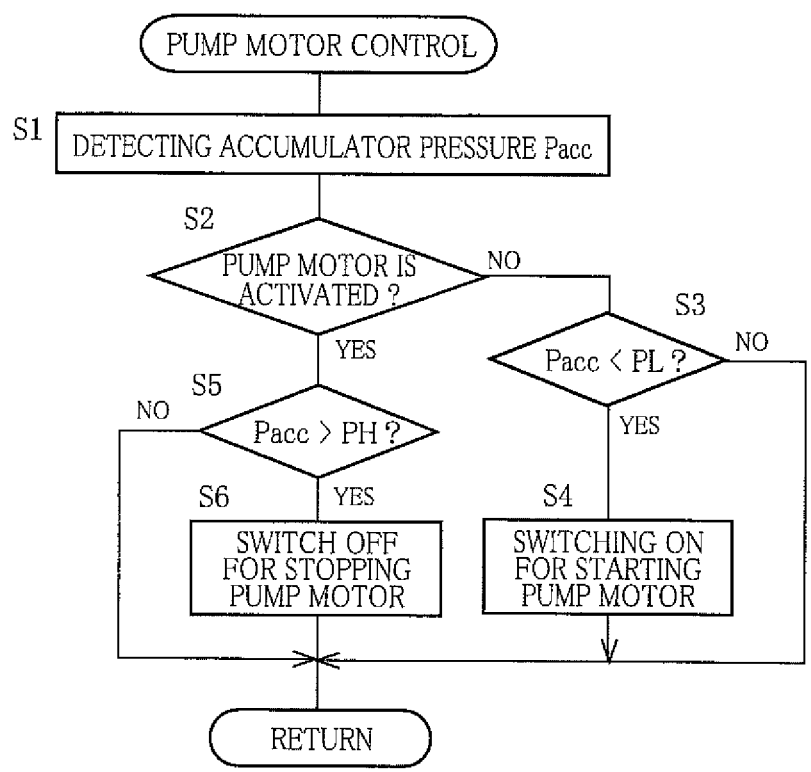
FIG. 9 is a flow chart representing a pump-motor control program that is stored in a storage portion of a brake ECU of the above-described brake system.

Further, a pump-motor controlling portion is constituted by at least portions of the brake ECU 110 that are assigned to store and execute the pump-motor control program represented by flow chart of FIG. 9. A solenoid controlling portion is constituted by at least portions of the brake ECU 110 that are assigned and implement S62, S65, S26 and S22. A brake-hydraulic-pressure controlling portion is constituted by the drive circuits 132, the solenoids 103 of the pressure-increasing linear valves 100 and the solenoid controlling portion.

Further, a brake-motor controlling portion is constituted by at least the drive circuits 64, the brake motor ECU 66 and portions of the brake ECU 110 that are assigned to store and implement S26, S64 and S66.

Embodiment 2

In Embodiment 1, the start of each of the brake motors 54 is delayed, when the activation of each brake motor 54 is requested in a state in which the electric current flowing through the pump motor 94 is large. However, in the present embodiment, a rate of increase of output of each brake motor 54 is restricted.

Figure 13:
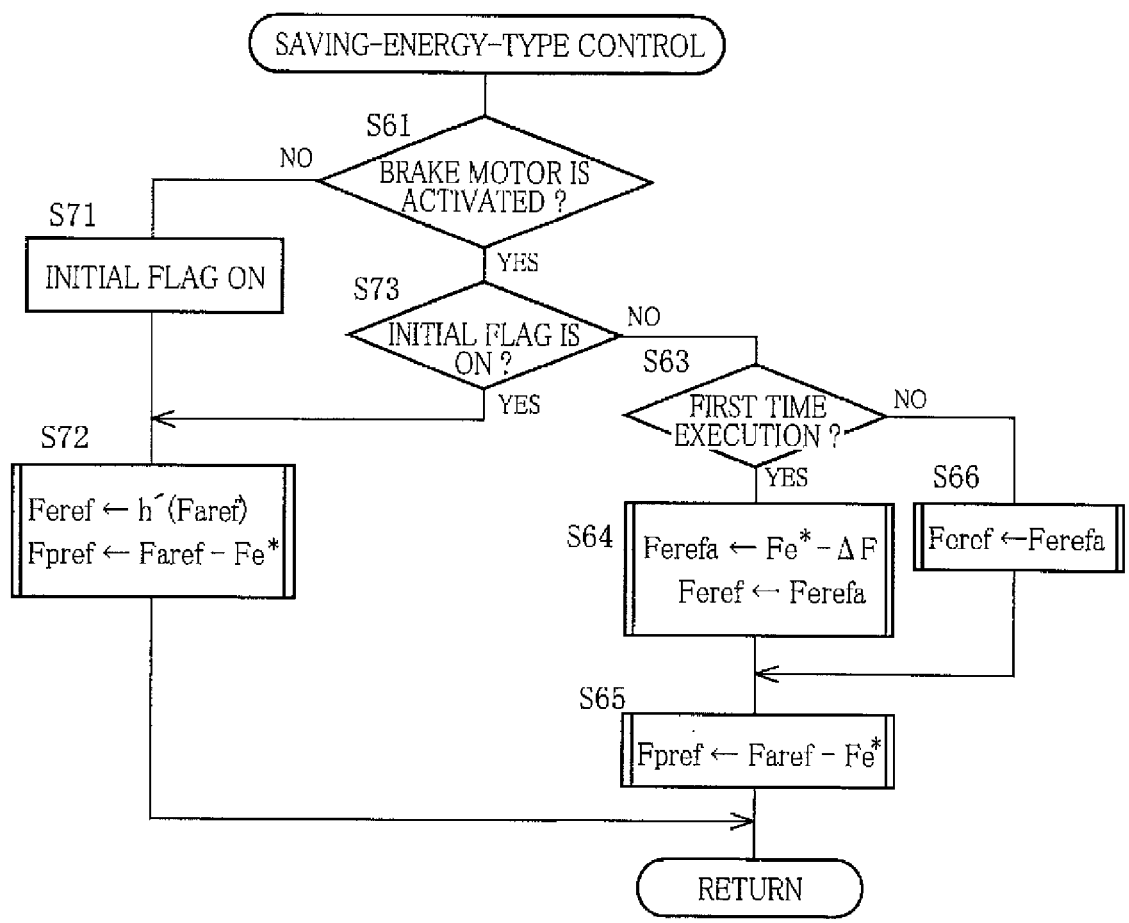
FIG. 13 is a flow chart representing a part (including the saving-energy type control) of the hydraulic/electric cooperative control program stored in the storage portion of the brake ECU of a brake system according to Embodiment 2 of the present invention. The present brake system includes an actuator control device according to Embodiment 2 of the present invention.

FIG. 13 is a flow chart representing a saving-energy type control routine.

When the electric brakes 40RL, 40RR are in the non-activated states, S71 and S72 are implemented. In S71, an initial flag is set to ON. In S72, the required electric friction braking force Feref is determined based on the required friction braking force Faref in accordance with a function h'. Further, the required hydraulic braking force Fpref is obtained based on a value that is obtained by subtracting the actual electric friction braking force Fe* from the required friction braking force Faref.

$$Feref \leftarrow h'(Faref) < h(Faref)$$

$$Fpref \leftarrow Faref - Fe*$$

As compared with the above-described function h, the function h' causes the required electric friction braking force Feref to be determined as a smaller value, even if the required friction braking force Faref is unchanged. In other words, the electric friction braking force Feref is determined as a smaller value, as compared with case of execution of the normal control.

The brake motors 54 are controlled such that the actual electric friction braking force Fe* becomes close to the required electric friction braking force Feref. The pressure-increasing linear valves 100 are controlled such that the actual hydraulic braking force Fp* becomes close to the required hydraulic braking force Fpref.

On the other hand, when the electric brakes 40RL, 40RR are being activated, S73 is implemented to judge whether the initial flag is ON. When the initial flag is ON, S72 is implemented to obtain the required electric friction braking force Feref and the required hydraulic braking force Fpref. When the initial flag is OFF, S63-S66 are implemented as in Embodiment 1.

The initial flag may be initialized (OFF) in S20x. However, it is also possible to employ an arrangement in which the initialization of the initial flag may be made in S26 in which the normal control is executed.

The initial flag is a flag that is provided for distinguishing between the output-increase-rate restriction control executed upon start of the brake motors 54 and the output reduction control executed during activations of the brake motors 54. In the present embodiment, the power consumption upon start of the brake motors 54 is gradually increased whereby the actual electric friction braking force Fe* becomes larger than 0. Thus, when the program is executed next time, a positive judgment (YES) is obtained in S61. However, since the initial flag is ON, S72 is implemented.

Thereafter, when the restriction flag is switched to OFF, S26 is implemented to execute the normal control.

Figure 14:
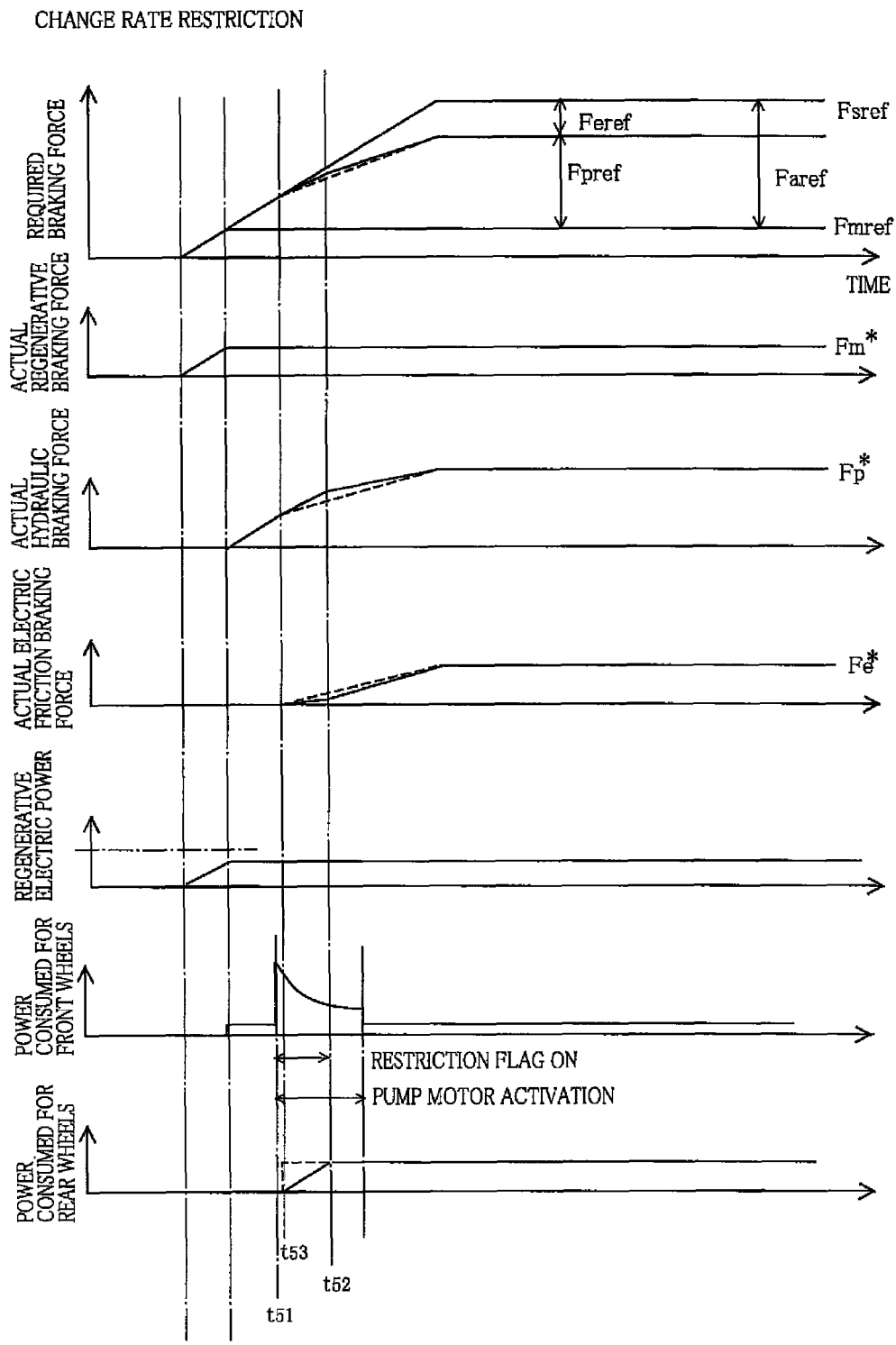
FIG. 14 is a view showing changes of braking forces and power consumption in case (increase-rate restriction) of execution of the regenerative cooperative control (including the saving-energy type control) in the above-described brake system.

FIG. 14 shows an example of the control in that case.

The restriction flag is held ON from a point $t_{51}$ of time until a point $t_{52}$ of time. At a point $t_{53}$ of time, the activations of the brake motors 54 are requested. However, a rate of increase of the required electric friction braking force Feref is made smaller than that in case of execution of the normal control (S26), because the restriction flag is ON. From the point $t_{52}$ of time, the normal control is executed.

Thus, in the present embodiment, too, it is possible to prevent the total power consumption from being made excessively large between the point $t_{51}$ of time and the point $t_{52}$ of time and to prevent the voltage drop in the power source device.

In the present embodiment, an increase-rate restricting portion is constituted by at least portions of the actuator control device that are assigned to store and implement S72.

It is noted that, between the point $t_{53}$ of time and the point $t_{52}$ of time, the required electric friction braking force Feref may be increased either (i) in a stepped manner or (ii) in a continuous manner.

Embodiment 3

Figure 15:
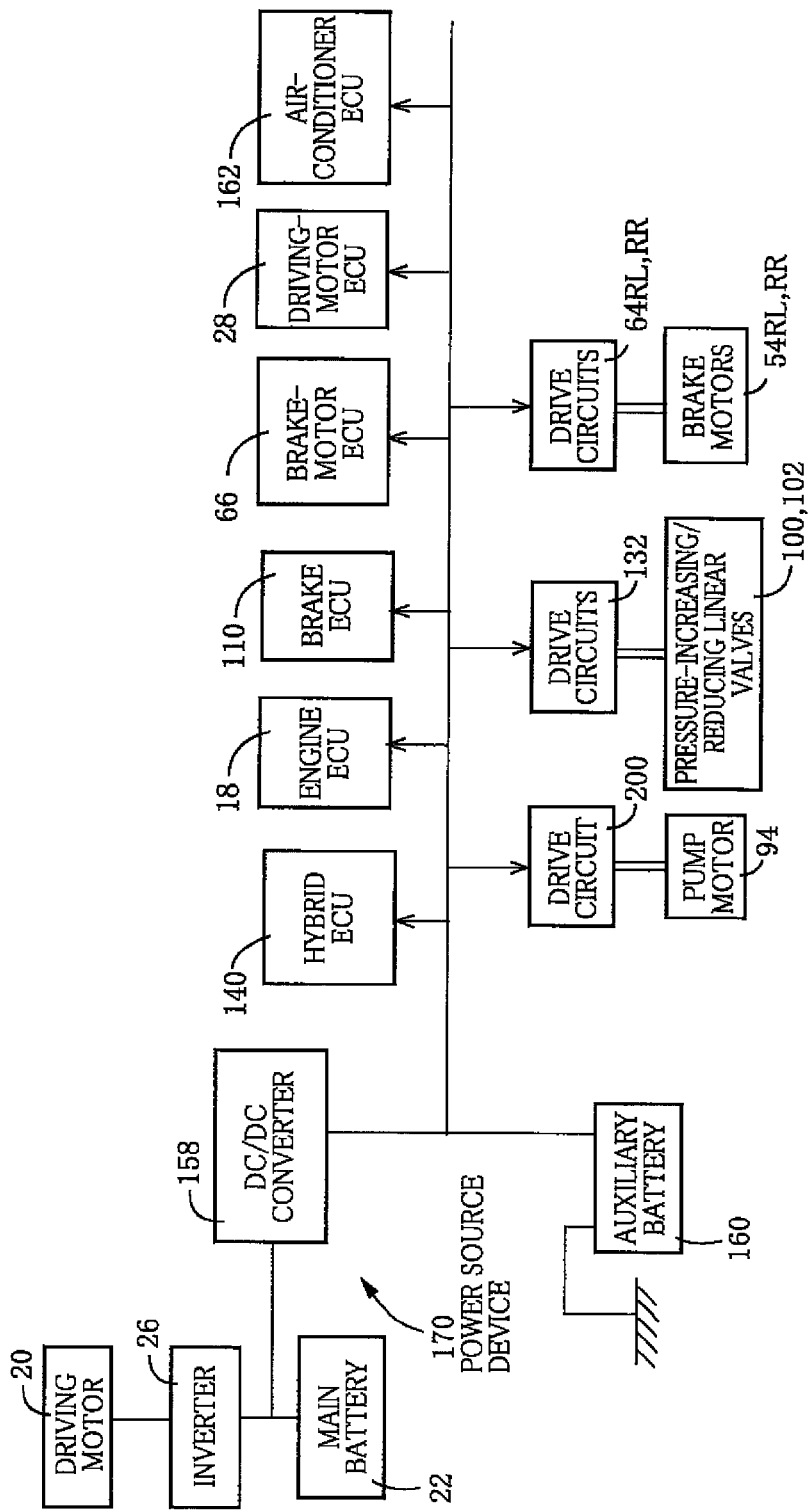
FIG. 15 is a view conceptually showing a power line of a vehicle that is equipped with a brake system according to Embodiment 3 of the present invention. The present brake system includes an actuator control device according to Embodiment 3 of the present invention.

In Embodiments 1 and 2, the drive circuit (switch) 130 is connected to the pump motor 94. However it is also possible to employ an arrangement as shown in FIG. 15 in which a drive circuit 200 capable of continuously controlling the electric current supplied to the pump motor 94 so as to gradually change the supplied electric current is connected to the pump motor 94 or an arrangement in which a drive circuit including an inrush-current restraining circuit is connected to the pump motor 94. In this Embodiment 3, the inrush current of the pump motor 94 is retrained by controlling the supplied electric current by the drive circuit 200.

Figure 16:
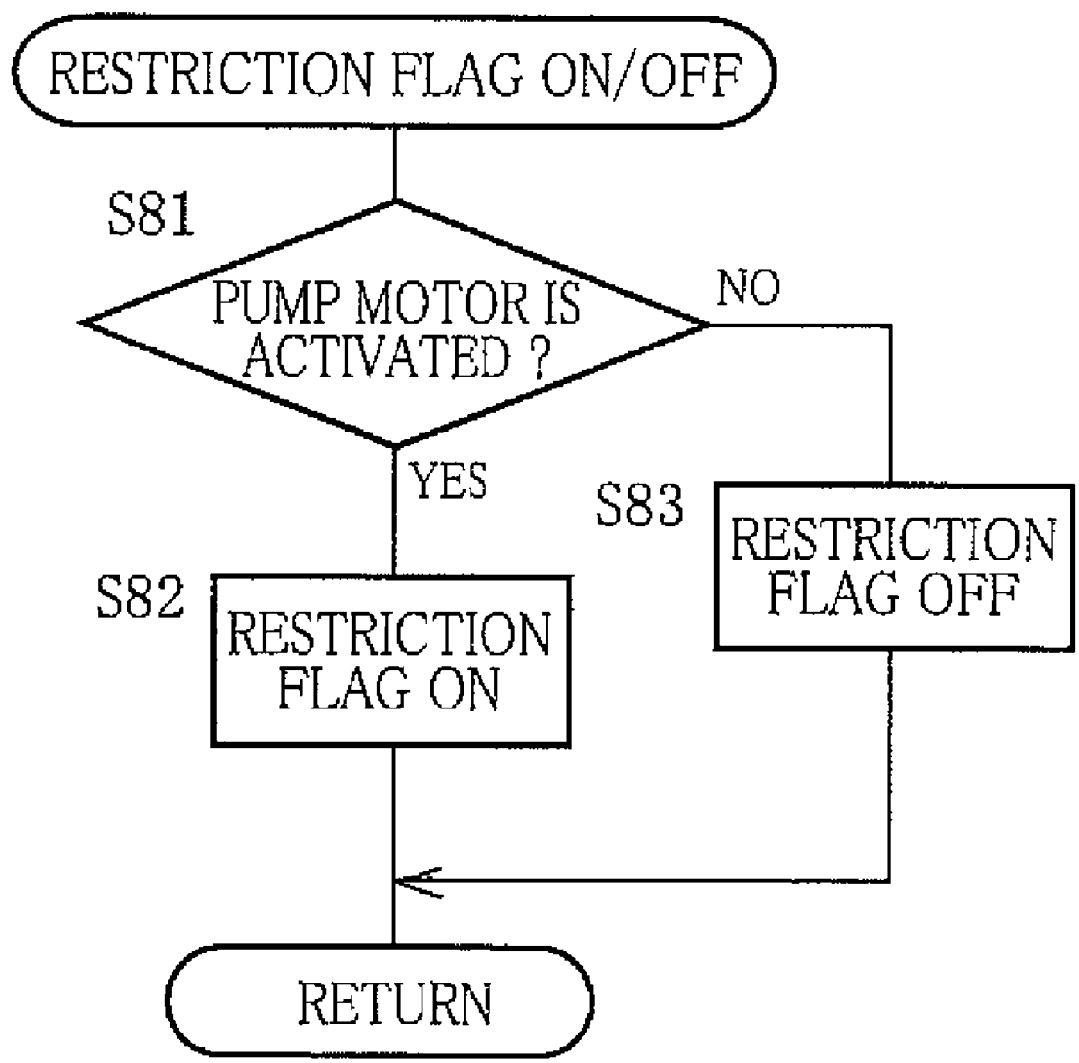
FIG. 16 is a flow chart representing a restriction-flag ON/OFF program that is stored in the storage portion of the brake ECU of the above-described brake system.

Further, in the present embodiment, the restriction flag is set to ON during activation of the pump motor 94, and is set to OFF during non-activation of the pump motor 94. In S81 in flow chart of FIG. 16, it is judged whether the pump motor 94 is in its activated state. When the pump motor 94 is in the activated state, S82 is implemented to set the restriction flag to ON. When the pump motor 94 is in the non-activated state, S83 is implemented to set the restriction flag to OFF.

Thus, in the present embodiment, the saving-energy type control is executed during activation of the pump motor 94.

Figure 17:
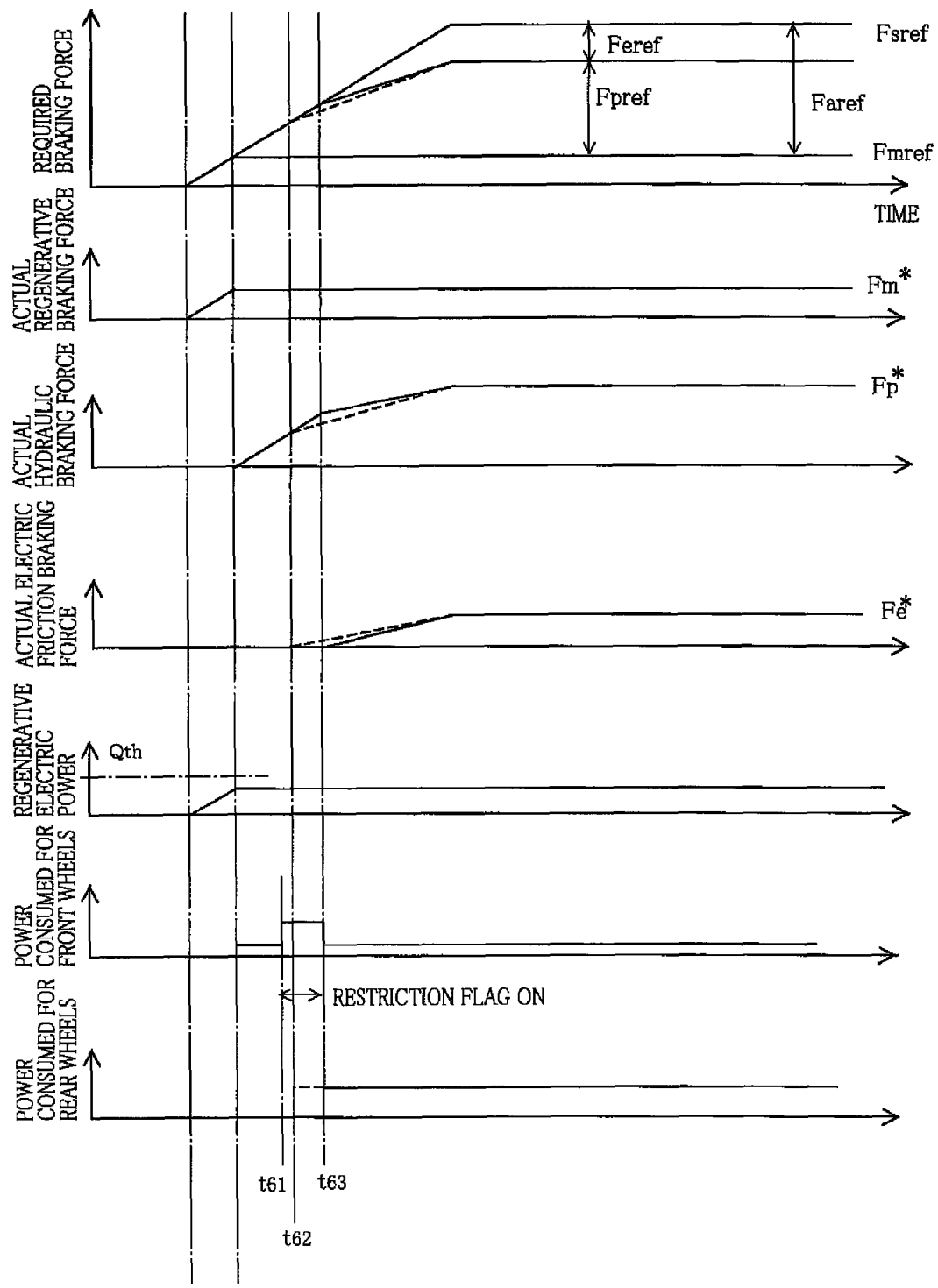
FIG. 17 is a view showing changes of braking forces and power consumption in case (start delay) of execution of the regenerative cooperative control (including the saving-energy type control) in the above-described brake system.
Figure 18:
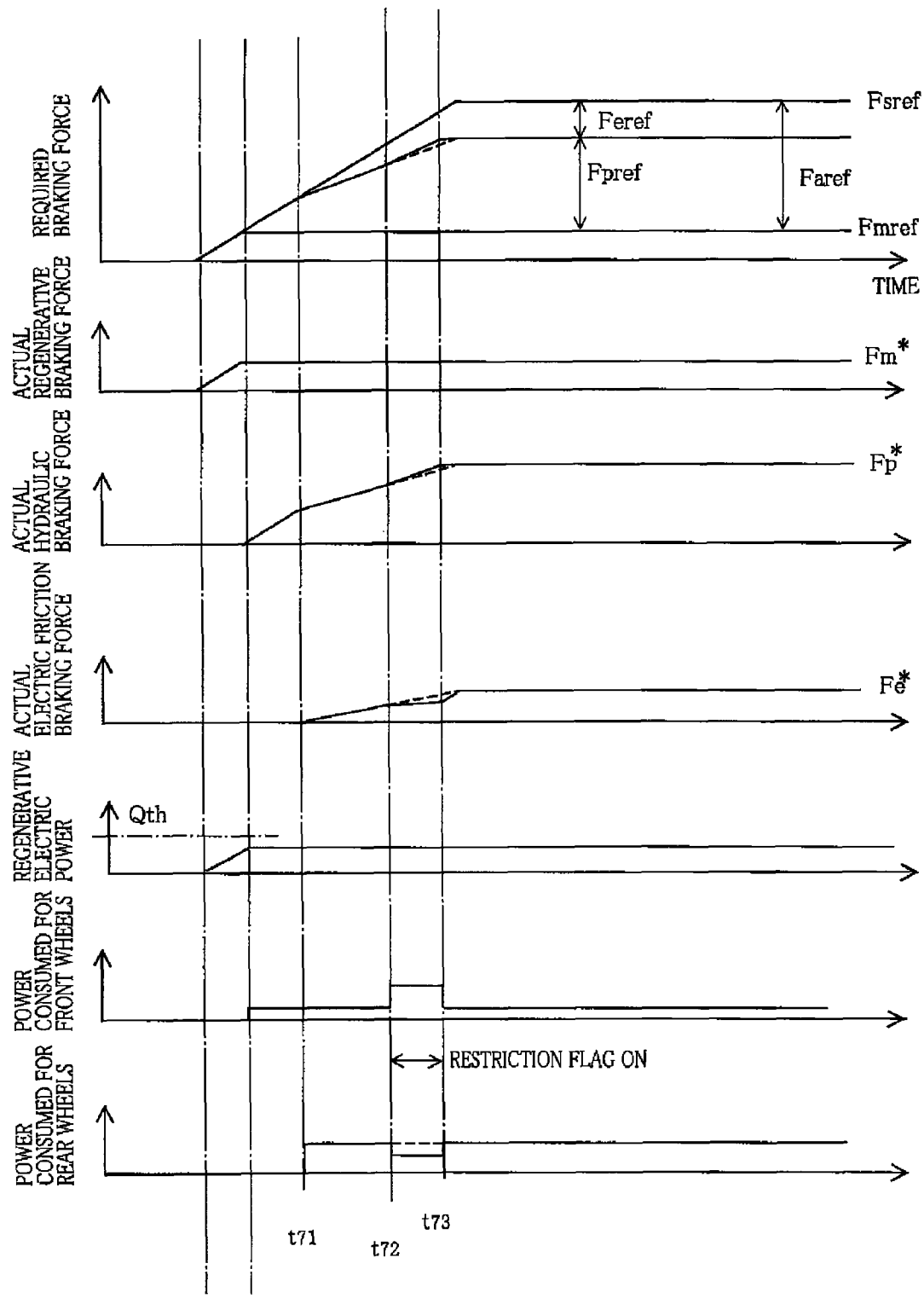
FIG. 18 is a view showing changes of braking forces and power consumption in case (output reduction) of execution of the regenerative cooperative control (including the saving-energy type control) in the above-described brake system.

FIGS. 17 and 18 show an example of the control in this case.

(A) Delay of Start of Brake Motors 54

In FIG. 17, when the pump motor 94 is started at a point $t_{61}$ of time, the restriction flag is set to ON. Thereafter, although the activations of the brake motors 54 are requested at a point $t_{62}$ of time, the start of each brake motor 54 is inhibited because the restriction flag is ON. The start of each brake motor 54 is allowed at a point $t_{63}$ of time at which the pump motor 94 is stopped whereby the restriction flag is switched to OFF. Further, as in Embodiment 1, the hydraulic braking force Fp is increased for compensating the braking force insufficiency resulting from the delay of start of each brake motor 54.

(B) Reduction of Output of Brake motors 54

In FIG. 18, the brake motors 54 are started at a point $t_{71}$ of time. When the pump motor 94 is started at a point $t_{72}$ of time during activations of the brake motors 54, the electric current supplied to each brake motor 54 is reduced and accordingly the actual electric friction braking force Fe* is reduced in a period ($t_{72}$-$t_{73}$) from start of the pump motor 94 until stop of the pump motor 94. Further, the hydraulic braking force Fp is increased whereby the required friction braking force Faref is satisfied.

Figure 19:
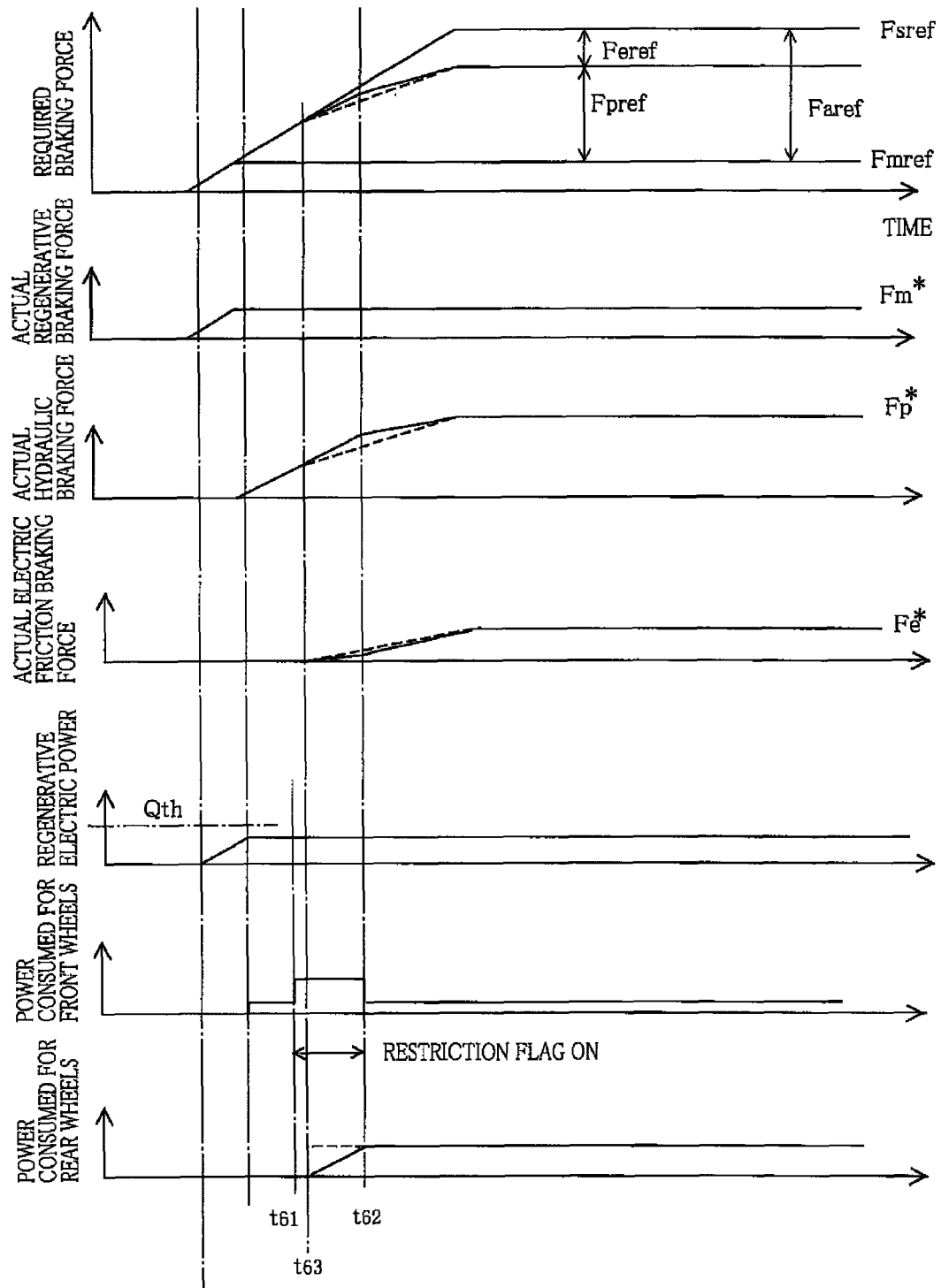
FIG. 19 is a view showing changes of braking forces and power consumption in case (increase-rate restriction) of execution of the regenerative cooperative control (including the saving-energy type control) in a brake system according to Embodiment 4 of the present invention. The present brake system includes an actuator control device according to Embodiment 4 of the present invention.

As shown in FIG. 19, in a period from a point $t_{61}$ of time until a point $t_{62}$ of time, the pump motor 94 is activated so that the restriction flag is ON. When the activations of the brake motors 54 are requested at a point $t_{63}$ of time, the electric current is supplied to each of the brake motors 54 such that the supply of the electric current is restricted in a period ($t_{63}$-$t_{62}$) until the restriction flag is switched to OFF. Thus, in this period ($t_{63}$-$t_{62}$), the amount of the electric current supplied to each brake motor 54 is made smaller than that in case of execution of the normal control, thereby satisfactorily avoiding the total power consumption from being made excessively large, In this Embodiment 5, it is predicted whether there is a possibility that activation of the pump motor 94 will be started during a period from a current point of time until a given time elapses. When it is predicted that the activation of the pump motor 94 will be started before the given time elapses, the saving-energy type control is executed. The given time is a relatively small length of time that does not cause inconvenience even when the power consumed by the bake motors 54 is reduced during this length of time.

In this Embodiment 5, the reduction of the power consumed by the brake motors 54 is started before the activation of the pump motor 94, so that it is possible to more reliably reduce the total power consumption.

Figure 20:
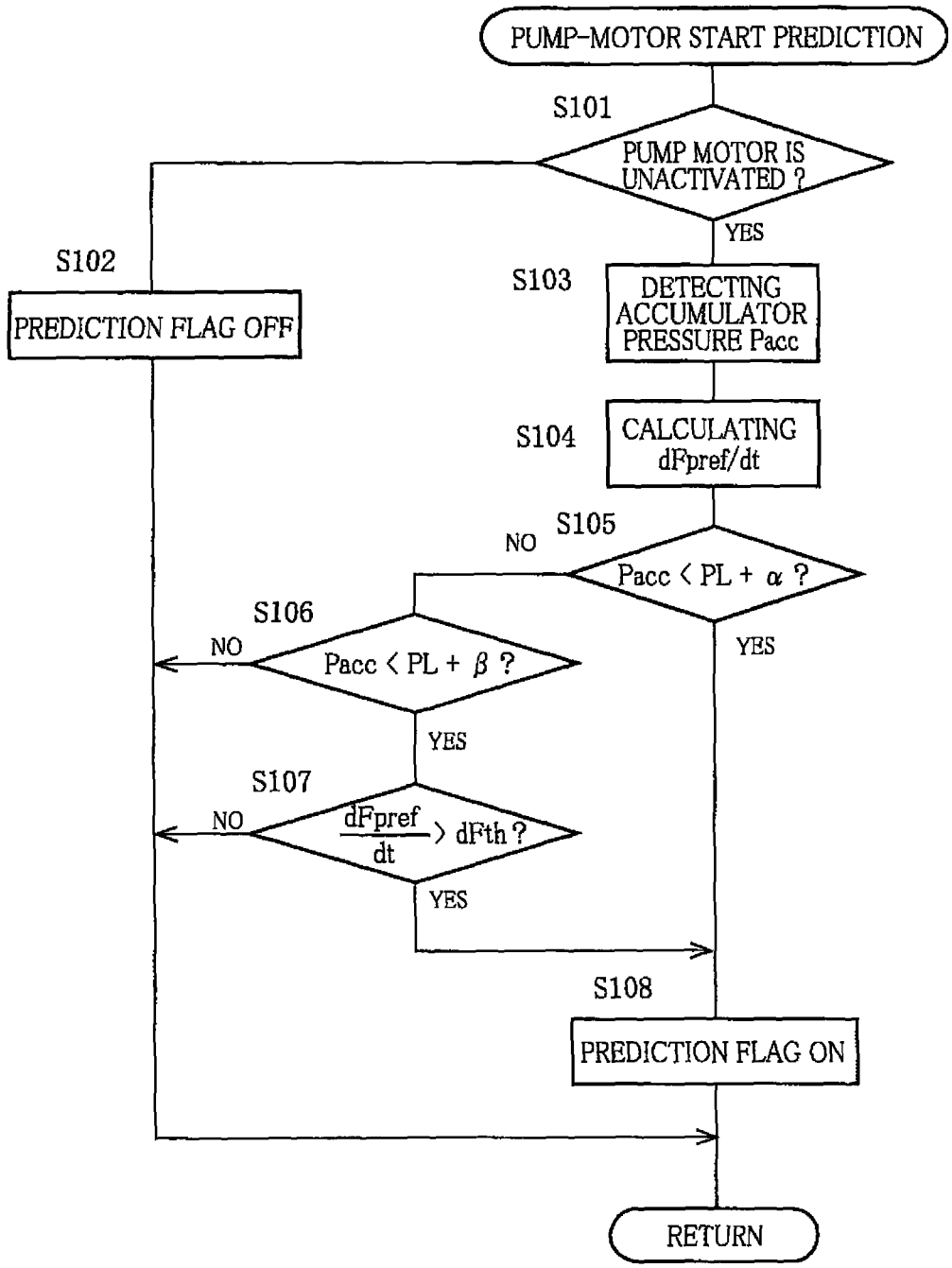
FIG. 20 is a flow chart representing a pump-motor-start prediction program that is stored in the storage portion of the brake ECU of the brake system according to Embodiment 5 of the present invention. The present brake system includes an actuator control device according to Embodiment 5 of the present invention.

The prediction of start of the pump motor 94 is made by execution of a pump-motor-start prediction program that is represented by flow chart of FIG. 20. In the present embodiment, it is predicted whether the activation of the pump motor 94 will be started during the period from the current point of time (i.e., a point of time of start of execution of the pump-motor-start prediction program) until the given time elapses, based on, for example, the accumulator pressure Pace and the increase rate of the required hydraulic braking force Fpref. When it is predicted that the activation of the pump motor 94 will be started during the above-described period, a prediction flag is set to ON.

In S101, it is judged whether the pump motor 94 is being unactivated. When the pump motor 94 is being activated, S102 is implemented to set the prediction flag to OFF because the start of the activation is not predicted during the activation. Further, since the pump motor 94 is in its non-activated state, it is considered that the accumulator pressure Pacc is higher than the lower limit value PL.

In S103, the accumulator pressure Pacc is detected by the accumulator pressure sensor 124. In S104, the rate of increase of the required hydraulic braking force Fpref is obtained. In S105, it is judged whether the accumulator pressure Pacc is smaller than a value obtained by adding a given value $\alpha$ to the lower limit value PL. In S106, it is judged whether the accumulator pressure Pacc is smaller than a value obtained by adding another given value $\beta$ (that is larger than the given value $\alpha$) to the lower limit value PL.

$$Pacc < PL + \alpha$$

$$PL + \alpha \leq Pacc < PL + \beta$$

$$\alpha < \beta$$

When a positive judgment (YES) is obtained in S105, namely, when the accumulator pressure Pacc is close to the lower limit value PL, S108 is implemented to set the prediction flag to ON.

When a negative judgment (NO) is obtained in S105 and a positive judgment (YES) is obtained in S106, the accumulator pressure Pacc is not smaller than (PL+$\alpha$) and is smaller than (PL+$\beta$). In this case, in S107 it is judged whether the increase rate dFpref/dt of the required hydraulic braking force Fpref is larger than a given rate dFth. When the increase rate dFpref/dt is larger than the given rate dFth, the prediction flag is set to ON in S108. This is because, although the accumulator pressure Pacc is larger than the lower limit value PL by the given value $\alpha$ or more, a reduction rate of the accumulator pressure Pacc is large since the increase rate of the required hydraulic braking force Fpref is large.

In the present embodiment, it is predicted that the activation of the pump motor 94 will be started upon satisfaction of one of two start-prediction conditions consisting of (i) a condition that the accumulator pressure Pacc is smaller than (PL+$\alpha$) and (ii) a condition that the accumulator pressure Pacc is not smaller than (PL+$\alpha$) and is smaller than (PL+$\beta$), with the increase rate dFpref/dt of the required hydraulic braking force Fpref being larger than the given rate dFth.

Figure 21:
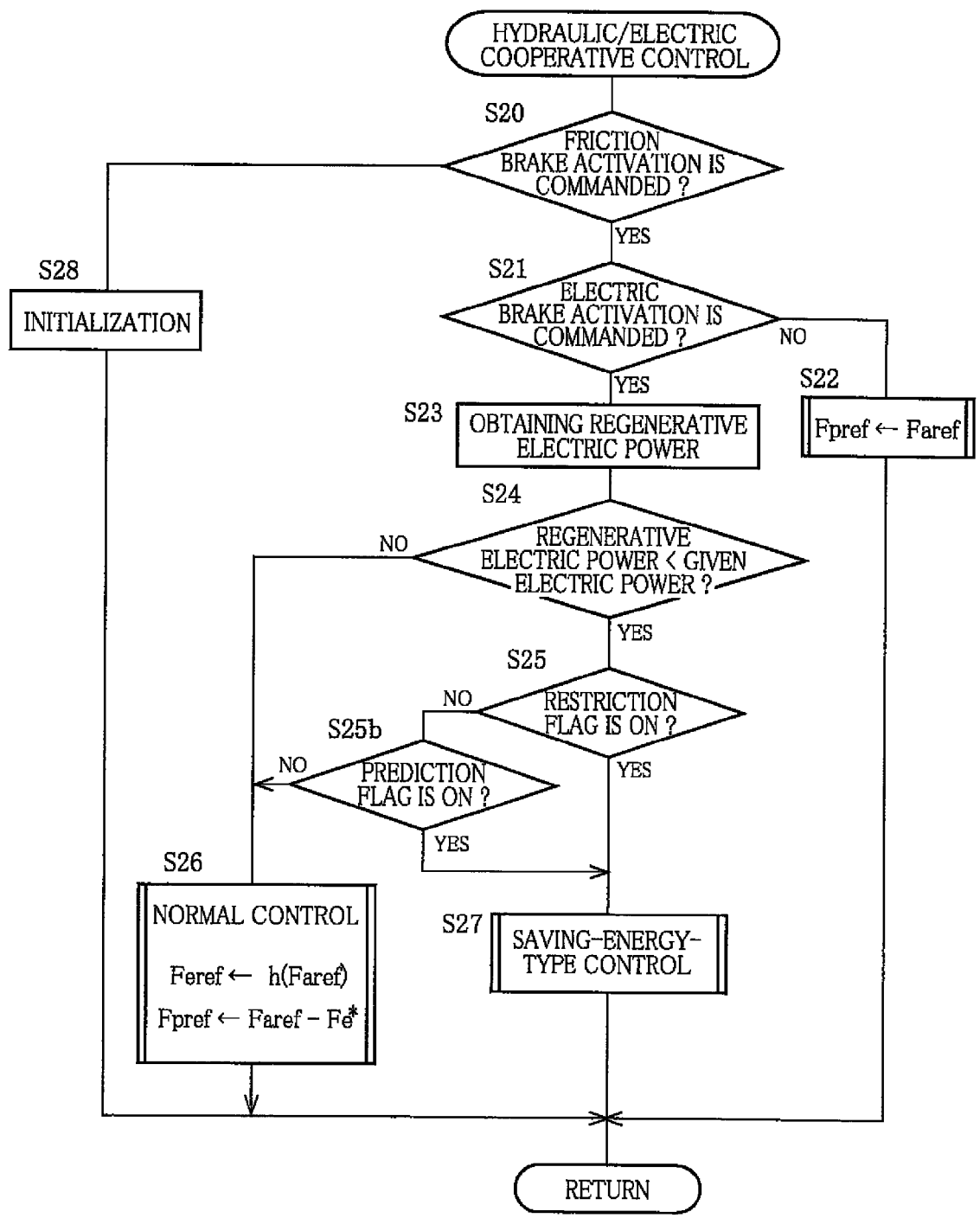
FIG. 21 is a flow chart representing the hydraulic/electric cooperative control program that is stored in the storage portion of the brake ECU of the above-described brake system.

The hydraulic/electric cooperative control is executed in accordance with a hydraulic/electric cooperative control program that is represented by flow chart of FIG. 21. The same step numbers as used in the above-described Embodiment 1 will be used to identify the corresponding steps, descriptions of which will not be provided.

When the restriction flag is OFF and a negative judgment (NO) is obtained in S25, the control flow goes to S25$b$ in which it is judged whether the prediction flag is ON. When the prediction flag is ON, S27 is implemented to execute the saving-energy type control although the restriction flag is OFF. When the prediction flag as well as the restriction flag is OFF, S26 is implemented to execute the normal control.

Figure 22:
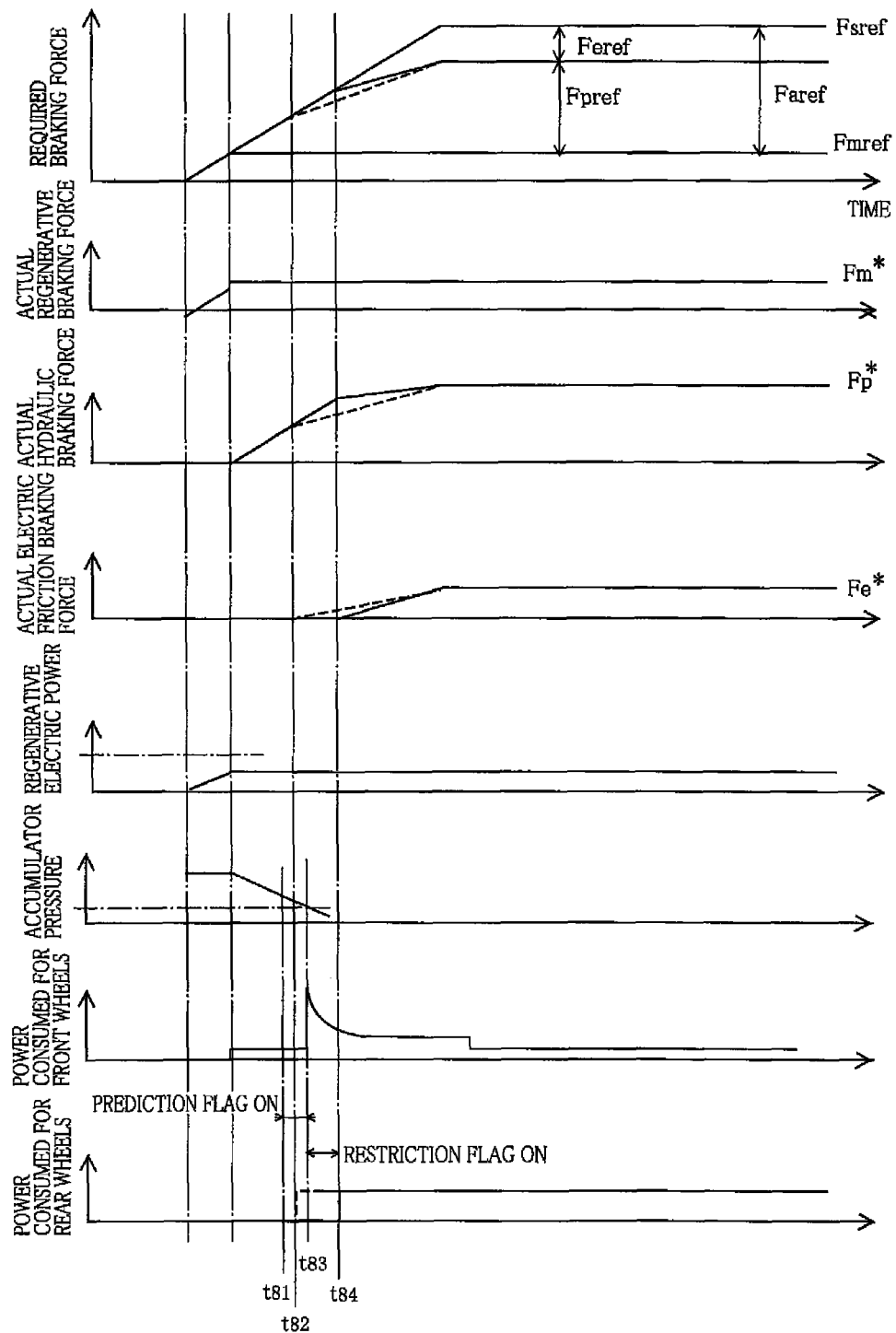
FIG. 22 is a view showing changes of braking forces and power consumption in case of execution of the regenerative cooperative control (including the saving-energy type control) in the above-described brake system.

FIG. 22 shows an example of the control.

The prediction flag is set to ON at a point $t_{81}$ of time when the accumulator pressure Pacc becomes close to the lower limit value PL. Due to the ON state of the prediction flag, the brake motors 54 are not started at a point $t_{82}$ of time although the activations of the brake motors 54 are requested at this point $t_{82}$ of time. At a point $t_{83}$ of time, the pump motor 94 is started so that the prediction flag is set to OFF while the restriction flag is set to ON. The restriction flag is held ON until a point $t_{84}$ of time. The start of each of the brake motors 54 is allowed when the restriction flag is switched to OFF.

Thus, in the present embodiment, the start of each brake motor 54 is inhibited from a point of time when the start of the pump motor 94 is predicted, so that it is possible to satisfactorily avoid the power consumption from being made excessively large.

In the present embodiment, an activation-predicted-state second-actuator power-consumption reducing portion is constituted by at least portions of the brake ECU 110 that are assigned to store and implement S25$b$ and S27.

In Embodiment 5, the output of each of the brake motors 54 is reduced when the prediction flag or the restriction flag is set to ON during activations of the brake motors 54, although there has been described only the delay of start of each brake motor 54 by way of example, Further, it is also possible to employ an arrangement in which the increase rate of output of each brake motor 54 is restricted upon start of each brake motor 54.

In the above-described embodiments, there has been described a case where the brake system is applied to the vehicle in which the drive wheels are constituted by the rear wheels 4RL, 4RR. However, the brake system may be applied also to a vehicle in which the drive wheels are constituted by the front wheels 42FL, 42FR. Where the regenerative braking force is applied to the front wheels 42FL, 42FR, the need to provide a limitation to the regenerative braking force is low so that it is possible to improve the energy efficiency.

Further, the constructions of the vehicle, hydraulic brake circuit and electric brakes are not particularly limited. For example, the brake system according to each of the above-described embodiments may be installed also in an electric vehicle, a fuel-cell vehicle and an engine vehicle that is not equipped with a driving motor. In the engine vehicle, the electric energy is returned to the power source device by a generator that is activated by an engine of the vehicle. The present invention can be carried out in not only the above-described modes but also in other modes of various modifications and improvements that will be made based on knowledge of a person skilled in the art.

DESCRIPTION OF REFERENCE SIGNS

26: inverter 28: driving motor 40: electric motor 44: hydraulic brake 54: brake motor 64: drive circuit 66: brake motor ECU 75: accumulator 94: pump motor 110: brake ECU 120: stroke sensor 122: manual pressure sensor 124: accumulator pressure sensor 126: brake-cylinder pressure sensor 130: drive circuit (switch) 132: drive circuit 140: hybrid ECU 142: auxiliary-battery monitoring unit 158: DC/DC convertor 160: auxiliary battery 200: drive circuit

The invention claimed is:

1. A brake system comprising:
a first brake device including: a first actuator that is at least one actuator to be activated by supply of an electric energy from a power source device installed in a vehicle; and a first brake configured to restrict rotation of a first wheel that is at least one of a plurality of wheels of the vehicle, by utilizing an output of said first actuator;
a second brake device including: a second actuator that is at least one actuator to be activated by supply of the electric energy from the power source device; and a second brake configured to restrict rotation of a second wheel that is at least one of the plurality of wheels which is other than the first wheel, by utilizing an output of said second actuator;

a regenerative-electric-energy obtaining device configured to obtain a regenerative electric energy that is the electric energy returned to the power source device; and an actuator control device configured to reduce a total consumed electric energy including the electric energy consumed individually by said first actuator and the electric energy consumed individually by said second actuator, by controlling at least one of said first actuator and said second actuator in a manner that maintains a state in which a required braking force is satisfied by at least one of a first braking force and a second braking force that are a braking force of said first brake and a braking force of said second brake, respectively, such that the total consumed electric energy is made smaller when the regenerative electric energy obtained by said regenerative-electric-energy obtaining device is smaller than a given electric energy, than when the regenerative electric energy obtained by said regenerative-electric-energy obtaining device is not smaller than the given electric energy.

2. The brake system according to claim 1, comprising a regenerative brake device which is configured to convert a kinetic energy of at least one electric driving motor, into the electric energy, and to return the electric energy to the power source device, said regenerative brake device being configured to apply a regenerative braking force to a drive wheel that is at least one of the first and second wheels, the at least one electric driving motor being connected to the drive wheel, wherein said regenerative-electric-energy obtaining device includes a regenerative-braking-force-based obtaining portion that is configured to obtain the regenerative electric energy, based on the regenerative braking force applied to the drive wheel by said regenerative brake device.

3. The brake system according to claim 1, wherein
said actuator control device includes a saving-energy-type actuator controlling portion that is configured to reduce the total consumed electric energy, by increasing the electric energy consumed in said first brake device and reducing the electric energy consumed in said second brake device, such that the total consumed electric energy is made smaller when the regenerative electric energy is small than when the regenerative electric energy is large.

4. The brake system according to claim 3,
wherein said first brake device includes a first-braking-force controlling actuator which is other than said first actuator and which is configured to control the first braking force,
wherein said second brake device is an electric friction brake device that is configured to restrict the rotation of the second wheel by causing a frictional engagement member to be pressed against a brake rotary body by a pressing force corresponding to the output of said second actuator, and
wherein said saving-energy-type actuator controlling portion includes a first-braking-force increasing portion that is configured to increase the first braking force by increasing the electric energy consumed by said first-braking-force controlling actuator, and to reduce the second braking force by reducing the electric energy consumed by said second actuator, such that the first braking force and the second braking force are respectively made larger and smaller when the regenerative electric energy is smaller than the given electric energy, than when the regenerative electric energy is not smaller than the given electric energy.

5. The brake system according to claim 4, wherein
said first-braking-force controlling actuator is configured to increase the first braking force with increase of the electric energy supplied to said first-braking-force controlling actuator, such that the first braking force is increased by a magnitude as the electric energy supplied to said first-braking-force controlling actuator is increased by an amount that is smaller than an amount by which the electric energy supplied to said second actuator is to be increased when the second force is required to be increased by the same magnitude.

6. The brake system according to claim 1, wherein
said saving-energy-type actuator controlling portion includes an activation-start delaying portion that is configured to delay start of activation of one of said first actuator and said second actuator.

7. The brake system according to claim 1, wherein
said actuator control device includes a torque-limiter-type actuator controlling portion that is configured to restrict the output of at least one of said first actuator and said second actuator, such that the output of said at least one of said first actuator and said second actuator is made smaller when the regenerative electric energy is smaller than a given electric energy, than when the regenerative electric energy is larger than the given electric energy.

8. The brake system according to claim 7, wherein
said torque-limiter-type actuator controlling portion includes an increase-rate restricting portion that is configured to restrict a rate of increase of the output of said at least one of said first actuator and said second actuator.

9. The brake system according to claim 1, wherein
said actuator control device includes an activation-state second-actuator power-consumption reducing portion that is configured to reduce the electric energy consumed individually by said second actuator, such that the electric energy consumed individually by said second actuator is smaller when the regenerative electric energy is smaller than the given electric energy and said first actuator is activated, than when the regenerative electric energy is not smaller than the given electric energy and/or said first actuator is in a non-activated state.

10. The brake system according to claim 1, wherein
said actuator control device includes an activation-predicted-state second-actuator power-consumption reducing portion that is configured to reduce the electric energy consumed individually by said second actuator, such that the electric energy consumed individually by said second actuator is smaller when the regenerative electric energy is smaller than a given electric energy and a probability that activation of said first actuator will be started is high, than when the regenerative electric energy is not smaller than the given electric energy and/or the probability that the activation of said first actuator will be started is low.

11. The brake system according to claim 1, wherein
the first wheel is each of front left and right wheels of the vehicle while the second wheel is each of rear left and right wheels of the vehicle.

12. The brake system according to claim 1, wherein
said actuator control device includes a first-actuator priority controlling portion that is configured to restrict the output of said second actuator without restricting the output of said first actuator, such that the output of said second actuator is smaller when the regenerative electric energy is smaller than a given electric energy, than when the regenerative electric energy is not smaller than the given electric energy.

13. The brake system according to claim 1, wherein said actuator control device includes an upper-limit-value-based controlling portion that is configured to control at least one of said first actuator and said second actuator in a manner that maintains a state in which the total consumed electric energy is smaller than an upper limit value that is determined depending on the regenerative electric energy.

14. The brake system according to claim 1, wherein said first brake device includes: (a) a brake cylinder; (b) a hydraulic brake that is configured to restrict rotation of the first wheel by pressing a frictional engagement member against a brake rotary body rotatable integrally with the first wheel; (c) a high pressure source that is to be activated by the electric energy supplied thereto from the power source device, so as to supply a highly pressurized working fluid to said brake cylinder; and (d) a brake-hydraulic-pressure controlling portion that is to be activated by the electric energy supplied thereto from the power source device, so as to control hydraulic pressure of said brake cylinder by utilizing hydraulic pressure of said high pressure source,
wherein said high pressure source includes: (i) an accumulator that is configured to store therein the working fluid such that the stored working fluid is pressurized; (ii) a pump that is connected to said accumulator; (iii) an electric pump motor that is configured to drive said pump; and (iv) a pump-motor controlling portion that is configured to control said pump motor such that hydraulic pressure of the working fluid stored in said accumulator is held in a given range,
wherein said brake-hydraulic-pressure controlling portion includes: (x) a pressure-increasing control valve that is disposed at least between said brake cylinder and said high pressure source; and (y) a solenoid controlling portion that is configured to control hydraulic pressure of said brake cylinder, by controlling the electric energy supplied from the power source device to a solenoid of said pressure-increasing control valve, and
wherein said hydraulic brake is said first brake while said pump motor is said first actuator.

15. The brake system according to claim 1, wherein said second brake device includes: (a) an electric brake motor that is to be activated by the electric energy supplied from the power source device; (b) a motion converting mechanism that is configured to convert a rotary motion of an output shaft of said brake motor into a linear motion of a pressing member; (c) an electric friction brake that is configured to restrict the rotation of the second wheel, by causing a frictional engagement member to be pressed against a brake rotary body rotatable integrally with the second wheel by a forward force of said pressing member; and (d) a brake-motor controlling portion that is configured to control the electric energy supplied from the power source device to said brake motor so as to control a pressing force by which said frictional engagement member is to be pressed against said brake rotary body, and
wherein said second actuator is said electric brake motor while said second brake is said electric friction brake.

16. A brake system comprising:
a first brake device including: a first actuator that is at least one actuator to be activated by supply of an electric energy from a power source device installed in a vehicle; and a first brake configured to restrict rotation of a first wheel that is at least one of a plurality of wheels of the vehicle, by utilizing an output of said first actuator;
a second brake device including: a second actuator that is at least one actuator to be activated by supply of the electric energy from the power source device; and a second brake configured to restrict rotation of a second wheel that is at least one of the plurality of wheels which is other than the first wheel, by utilizing an output of said second actuator;
a regenerative-electric-energy obtaining device configured to obtain a regenerative electric energy that is the electric energy returned to the power source device; and
an actuator control device configured to control said second actuator, such that the electric energy consumed by said second actuator is smaller when the regenerative electric energy obtained by said regenerative-electric-energy obtaining device is smaller than a given electric energy and said first actuator is in an activated state, than when the regenerative electric energy is not smaller than the given electric energy and/or said first actuator is not in the activated state,
wherein the first wheel is a front wheel of the vehicle while the second wheel is a rear wheel of the vehicle.

17. An actuator control device which is to be connected to a power source device installed in a vehicle, and which is configured to control a plurality of actuators that are to be activated by supply of an electric energy from the power source device, the vehicle including a regenerative brake device that is configured to convert a kinetic energy of at least one electric driving motor, into the electric energy, and to return the electric energy to the power source device, the regenerative brake device being configured to apply a regenerative braking force to at least one drive wheel of the vehicle, the at least one electric driving motor being connected to the at least one drive wheel,
said actuator control device comprising:
a regenerative-electric-energy obtaining device configured to obtain a regenerative electric energy that is the electric energy returned to the power source device; and
a saving-energy-type actuator controlling portion that is configured to control at least one of the plurality of actuators in a manner that maintains a state in which a total consumed electric energy including the electric energies consumed individually by the plurality of actuators is made smaller when the regenerative electric energy obtained by said regenerative-electric-energy obtaining device is smaller than a given electric energy, than when the regenerative electric energy obtained by said regenerative-electric-energy obtaining device is not smaller than the given electric energy.

18. The actuator control device according to claim 17, wherein one of the plurality of actuators is a pump motor that is configured to drive a pump for pumping a working fluid, pressurizing the pumped working fluid, and supplying the pressurized working fluid to an accumulator, and
wherein said saving-energy-type actuator controlling portion includes a pump-motor-priority consumed-electric-energy reducing portion that is configured to reduce the electric energy consumed by another of the plurality of actuators which is other than the pump motor without reducing the electric energy consumed by the pump motor.

* * * * *